US012410041B2

(12) United States Patent
Strauss et al.

(10) Patent No.: US 12,410,041 B2
(45) Date of Patent: Sep. 9, 2025

(54) LIFTING AND LOWERING TOOL

(71) Applicant: Stanley Black & Decker, Inc., New Britain, CT (US)

(72) Inventors: Ralf Strauss, Stanley, NC (US); Robin E. Smith, Stanley, NC (US); Stephen Rowlay, Derbyshire (GB)

(73) Assignee: Stanley Black & Decker, Inc., New Britain, CT (US)

( * ) Notice: Subject to any disclaimer, the term of this patent is extended or adjusted under 35 U.S.C. 154(b) by 0 days.

(21) Appl. No.: 18/699,183

(22) PCT Filed: Oct. 21, 2022

(86) PCT No.: PCT/US2022/047468
§ 371 (c)(1),
(2) Date: Apr. 5, 2024

(87) PCT Pub. No.: WO2023/076123
PCT Pub. Date: May 4, 2023

(65) Prior Publication Data

US 2024/0417224 A1 Dec. 19, 2024

Related U.S. Application Data

(60) Provisional application No. 63/271,632, filed on Oct. 25, 2021.

(51) Int. Cl.
*B66F 1/02* (2006.01)
*B05C 17/01* (2006.01)
(Continued)

(52) U.S. Cl.
CPC .......... *B66F 3/005* (2013.01); *B05C 17/0123* (2013.01); *B66F 1/02* (2013.01);
(Continued)

(58) Field of Classification Search
CPC .......... B05C 17/0123; B25F 1/00; B66F 1/00; B66F 1/02; B66F 3/00; B66F 3/25;
(Continued)

(56) References Cited

U.S. PATENT DOCUMENTS 388,156 A 8/1888 Strom
504,935 A 9/1893 McMurrin
(Continued)

FOREIGN PATENT DOCUMENTS

CA 2195358 C 6/2000
CA 2849831 A1 * 10/2014 ............. E05C 17/54
(Continued)

OTHER PUBLICATIONS

Construction Jack Showdown: DeWalt ToughSeries vs Irwin Quick-Lift found at: https://www.youtube.com/watch?v=B8iWCB5wlVk (Year: 2024).*

(Continued)

*Primary Examiner* — Mahdi H Nejad
(74) *Attorney, Agent, or Firm* — Gabriel A. Haboubi

(57) ABSTRACT

A lifting and lowering tool includes a foot configured to be supported on a surface, a bar extending therefrom, and a movable assembly including a housing, a movable platform shaped to support a load that extends from the housing, a lifting actuator configured to incrementally move the movable assembly along the bar away from the foot, a lowering actuator configured to incrementally move the movable assembly along the bar towards the foot, and a release actuator configured to disengage the movable assembly from the bar to allow free movement of the movable assembly along the bar. In embodiments, the movable assembly engages the bar through locking plates that extend through a flange of the movable assembly. In embodiments the release actuator is spaced from the lifting actuator and the
(Continued)

lowering actuator to prevent inadvertent actuation of the release actuator. In embodiments a flange of the movable assembly surrounds the bar.

6 Claims, 29 Drawing Sheets

(51) Int. Cl.
*B66F 1/00* (2006.01)
*B66F 3/00* (2006.01)
*B25B 5/06* (2006.01)

(52) U.S. Cl.
CPC ................. *B25B 5/068* (2013.01); *B66F 1/00* (2013.01); *B66F 2700/025* (2013.01)

(58) Field of Classification Search
CPC .... B66F 3/005; B66F 2700/025; B66F 13/00; B66F 3/46; B25B 5/068; E04F 21/0023
USPC ................. 254/105, 133 R; 269/6; 74/141.5; 222/391
See application file for complete search history.

(56) References Cited

U.S. PATENT DOCUMENTS 595,216 A 12/1897 Snell
986,868 A 3/1911 Schofield
1,152,507 A 9/1915 Hiatt
1,516,616 A 11/1924 Meyer
1,647,049 A 10/1927 Lake
2,262,429 A 11/1941 Lucker
2,786,650 A 3/1957 Bottorff
2,820,608 A * 1/1958 Braselmann .............. B66F 1/02 254/105
2,823,551 A * 2/1958 Utz ........................... B66F 1/02 74/141.5
3,064,945 A 11/1962 Forbes
3,326,526 A * 6/1967 Takeuchi .................. B66F 1/02 254/106
3,819,153 A 6/1974 Hurst et al.
3,891,187 A 6/1975 Bearden, Jr.
3,930,645 A 1/1976 Anderson
4,009,804 A 3/1977 Costa et al.
4,084,792 A 4/1978 Baron et al.
4,240,611 A 12/1980 Bartlett
4,281,709 A 8/1981 Busse
4,500,000 A 2/1985 Membrino
4,926,722 A 5/1990 Sorensen et al.
5,261,643 A 11/1993 Wurdack
5,286,978 A 2/1994 Yoshida et al.
5,385,335 A 1/1995 Wurdack
5,425,260 A 6/1995 Gehron
5,454,551 A 10/1995 Hobday
5,622,355 A 4/1997 Kopp
5,806,836 A 9/1998 Wilson
5,853,168 A 12/1998 Drake
5,909,911 A 6/1999 Long
6,026,128 A 2/2000 Goeckler et al.
6,189,443 B1 2/2001 Hilford
6,286,718 B1 9/2001 Durrant
6,371,449 B1 4/2002 Chamberlain
6,382,608 B1 5/2002 Michell
6,386,530 B1 5/2002 Marks
6,530,740 B2 3/2003 Kim
6,726,180 B2 4/2004 Alten
6,746,006 B2 6/2004 Thomas
7,493,853 B2 2/2009 Xue
7,815,175 B2 10/2010 Cicenas et al.
7,959,039 B2 6/2011 Beckett
8,074,340 B2 12/2011 Cicenas et al.
8,091,874 B2 1/2012 Ray Avalani
8,276,251 B2 10/2012 Mitchell
8,313,089 B2 11/2012 Bogert
8,365,953 B2 2/2013 Calvo et al.
8,393,063 B2 3/2013 Hodges et al.
8,424,856 B2 4/2013 Lombardi et al.
8,585,018 B2 11/2013 Seber et al.
8,702,076 B2 4/2014 Cicenas et al.
8,882,093 B2 11/2014 Kuo
9,255,415 B2 2/2016 Gregersen
9,522,456 B2 12/2016 Cicenas et al.
9,637,362 B2 5/2017 Zhang
9,683,620 B2 6/2017 Buchanan
9,751,193 B2 9/2017 Evatt et al.
10,774,552 B2 9/2020 Klein et al.
11,603,297 B1 3/2023 Chen
2005/0029813 A1 2/2005 Geppert et al.
2006/0278858 A1 12/2006 Brocchini, Jr.
2006/0290041 A1 12/2006 Hobday
2007/0003364 A1 1/2007 Hubbard
2007/0209204 A1 9/2007 Chase et al.
2008/0111117 A1 5/2008 Wu
2010/0276090 A1 11/2010 Zagone
2012/0153245 A1 6/2012 Zloch et al.
2013/0292892 A1 11/2013 Huang
2014/0319437 A1* 10/2014 Plummer ................ E05C 17/54 254/105
2016/0288161 A1* 10/2016 Yi ....................... B05C 17/0123
2017/0136606 A1 5/2017 Li
2018/0297827 A1* 10/2018 Cooper .................. G01N 19/04
2021/0024336 A1 1/2021 Oyvind et al.
2024/0083723 A1* 3/2024 Chen ......................... B66F 1/02

FOREIGN PATENT DOCUMENTS

CN 2586773 Y * 11/2003
CN 2917997 Y 7/2007
CN 201056853 Y 5/2008
CN 201205688 Y 3/2009
CN 201264275 Y 7/2009
CN 101518891 A 9/2009
CN 101683742 A 3/2010
CN 201471644 U 5/2010
CN 201702739 U 1/2011
CN 202808297 U 3/2013
CN 202846467 U 4/2013
CN 103358242 A 10/2013
CN 204199645 U 3/2015
CN 206189828 U 5/2017
CN 207158674 U * 3/2018
CN 108584755 A * 9/2018 ................ B66F 1/02
CN 208200310 U 12/2018
CN 208235908 U 12/2018
CN 208235909 U 12/2018
CN 208415872 U 1/2019
CN 208430750 U 1/2019
CN 106744495 B 8/2022
CN 218507456 U * 3/2023 ................ B25F 1/00
DE 7004678 U 6/1970
DE 2002246 A1 * 7/1971
DE 8703379 U1 7/1987
DE 4028274 A1 3/1991
DE 19532573 A1 3/1997
DE 29802328 U1 5/1998
DE 29806101 U1 7/1998
DE 10127718 A1 12/2002
DE 202010000256 U1 8/2011
DE 202012004735 U1 7/2012
DE 102014116514 A1 5/2016
DE 202022106262 U1 * 2/2023
EP 0098703 A2 1/1984
EP 0558354 A1 * 9/1993
EP 0526826 B1 10/1997
EP 1786717 A1 5/2007
EP 3401466 A1 11/2018
EP 3706959 B1 1/2022
GB 156360 A 1/1921
GB 501554 A 3/1939
GB 723411 A 2/1955
GB 732528 A 6/1955
GB 2385396 B 8/2004
GB 2416528 A 2/2006

(56) References Cited

FOREIGN PATENT DOCUMENTS

| | | | | | |
|---|---|---|---|---|---|
| GB | 2457090 | A | | 8/2009 | |
| GB | 2460904 | B | | 3/2012 | |
| GB | 2520302 | A | | 5/2015 | |
| GB | 2578907 | A | | 6/2020 | |
| JP | S4525065 | Y1 | | 10/1970 | |
| JP | S5655451 | U | | 5/1981 | |
| JP | S5919088 | A | | 1/1984 | |
| JP | H02105993 | A | | 4/1990 | |
| JP | H02105993 | U | | 8/1990 | |
| JP | H04304617 | A | | 10/1992 | |
| JP | 1840801 | C3 | | 4/1994 | |
| JP | H08218738 | A | | 8/1996 | |
| JP | 3138845 | B2 | | 2/2001 | |
| JP | 4206503 | B1 | | 1/2009 | |
| JP | 2009113027 | A | | 5/2009 | |
| JP | 4304617 | B2 | | 7/2009 | |
| JP | 2009270398 | A | | 11/2009 | |
| JP | 6150397 | Y | | 6/2017 | |
| NO | 20190508 | A1 | * | 10/2020 | |
| SE | 1200323 | A1 | | 4/2013 | |
| WO | 1995008504 | A1 | | 3/1995 | |
| WO | 1999041509 | A1 | | 8/1999 | |
| WO | 2000014007 | A1 | | 3/2000 | |
| WO | 2006008480 | A1 | | 1/2006 | |
| WO | 2007107537 | A1 | | 9/2007 | |
| WO | 2016122210 | A1 | | 8/2016 | |
| WO | 2019160424 | A1 | | 8/2019 | |
| WO | WO2020/209731 | A1 | * | 10/2020 | |
| WO | 2023076123 | A1 | | 5/2023 | |
| WO | 2023225287 | A1 | | 11/2023 | |
| WO | WO-2024132479 | A1 | * | 6/2024 | ................ B66F 1/02 |

OTHER PUBLICATIONS

Comparing the Viking Arm to the Dewalt and Irwin Jacks found at: https://www.youtube.com/watch?v=_ 83_P2Hpan0 (Year: 2024).*

Viking Arm | The New Generation of Professional Grade Tools) found at: https://www.youtube.com/watch?v=yAPw7iV3-hg (Year: 2020).*

Written Opinion of the International Searching Authority, dated Mar. 28, 2023, in corresponding PCT Application No. PCT/US2022/047468.

International Preliminary Report on Patentability, dated Jun. 24, 2020, for PCT Application No. PCT/NO2020/050100.

Photos of VW jacks 1 and 2 showing markings.

Beetle Owners Manual 1200, Volkswagen Werk AG, dated Aug. 1964, pp. 27-29 (exterior and interior of front and back covers also included).

Fastcap, "The New and Improved Jack of All Trades" https://www.youtube.com/watch?v=VFriSAeggTI&t=55s, Jun. 23, 2016.

Fastcap, "Jack of All Trades Product Information" https://web.archive.org/web/20181210225729/https://www.fastcap.com/product/jack-of-all-trades, at least as early as Dec. 10, 2018.

Fastcap, "FastCap Introduces Jack" https://web.archive.org/web/20040113080112/http:/www.fastcap.com:80/1103_new/press.asp?page=jack_rel, Dec. 12, 2002.

FastCap "The Jack of All Trades" instruction page—believed to be released with product on Dec. 12, 2002 per FastCap press release—composite photo created from photos posted on https://www.ebay.com/itm/116010852796 for a listing of a used product.

Extended European Search Report mailed Sep. 18, 2024 in related EP application No. 24175292.2, 4 pages.

Search and Examination Report mailed Sep. 24, 2024 under Sections 17 & 18(3) in related GB application No. 2406634.2, 2 pages.

Swedish Search Report mailed Sep. 4, 2024 in related application No. 2430270-5, 10 pages.

2nd Examination Report mailed Feb. 3, 2025 in related Danish application No. BA 2024 00034, 5 pages.

* cited by examiner

LIFTING AND LOWERING TOOL

CROSS REFERENCE TO RELATED APPLICATIONS

This application is a national stage filing under 35 U.S.C. § 371 of International Application PCT/US2022/047468 filed on Oct. 21, 2022, which claims priority to U.S. Provisional Patent Application Ser. No. 63/271,632, filed on Oct. 25, 2021, each of which is incorporated herein by reference in their entireties.

FIELD OF THE INVENTION

The present invention relates generally to hand tools, and more particularly to spreaders or jacks.

BACKGROUND OF THE INVENTION

Conventional lifting and lowering tools, such as jacks, are known. Among other things, the present application relates to various improvements to lifting and lowering tools, which may be used for controlled raising or lowering of objects such as doors, windows, framing segments, pallets, and so on. This disclosure includes various improvements which may be utilized together or independently in various embodiments.

SUMMARY OF THE INVENTION

According to an embodiment, a lifting and lowering tool includes a foot configured to be supported on a surface, a bar extending from the foot, and a movable assembly. The movable assembly includes a housing, a movable platform shaped to support a load thereon, the movable platform extending from the housing and coupled to the housing by a flange, a lifting actuator configured to incrementally move the movable assembly along the bar away from the foot, a lowering actuator configured to incrementally move the movable assembly along the bar towards the foot, and a release actuator configured to disengage the movable assembly from the bar to allow free movement of the movable assembly along the bar. The movable assembly engages the bar through locking plates that are selectively disengaged from the bar through actuation of the lowering actuator, and the locking plates extend through the flange.

According to another embodiment, a lifting and lowering tool includes a foot configured to be supported on a surface, a bar extending from the foot, and a movable assembly. The movable assembly includes a housing, a movable platform shaped to support a load thereon, a lifting actuator configured to incrementally move the movable assembly along the bar away from the foot, a lowering actuator configured to incrementally move the movable assembly along the bar towards the foot, and a release actuator configured to disengage the movable assembly from the bar to allow free movement of the movable assembly along the bar. The release actuator is spaced from the lifting actuator and the lowering actuator to prevent inadvertent actuation of the release actuator.

According to another embodiment, a lifting and lowering tool includes a foot configured to be supported on a surface, a bar extending from the foot, and a movable assembly. The movable assembly includes a housing, a movable platform shaped to support a load thereon, the movable platform extending from the housing and including a flange extending from the movable platform and surrounding the bar, a lifting actuator configured to incrementally move the movable assembly along the bar away from the foot, a lowering actuator configured to incrementally move the movable assembly along the bar towards the foot, and a release actuator configured to disengage the movable assembly from the bar to allow free movement of the movable assembly along the bar.

According to another embodiment, a lifting and lowering tool includes a foot configured to be supported on a surface, a bar extending from the foot, and a movable assembly. The movable assembly includes a housing, a movable platform shaped to support a load thereon, the movable platform extending above the bar away from the foot when the movable assembly is adjacent to the foot, a lifting actuator configured to incrementally move the movable assembly along the bar away from the foot, a lowering actuator configured to incrementally move the movable assembly along the bar towards the foot, and a release actuator configured to disengage the movable assembly from the bar to allow free movement of the movable assembly along the bar.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

BRIEF DESCRIPTION OF THE DRAWINGS

Features of lifting and lowering tools in accordance with one or more embodiments are shown in the drawings, in which like reference numerals designate like elements. The drawings form part of this original disclosure in which.

DETAILED DESCRIPTION OF THE ILLUSTRATED EMBODIMENT(S)

FIGS. 1-5C illustrate a lifting and lowering tool 100 according to a first embodiment.

Figure 1:
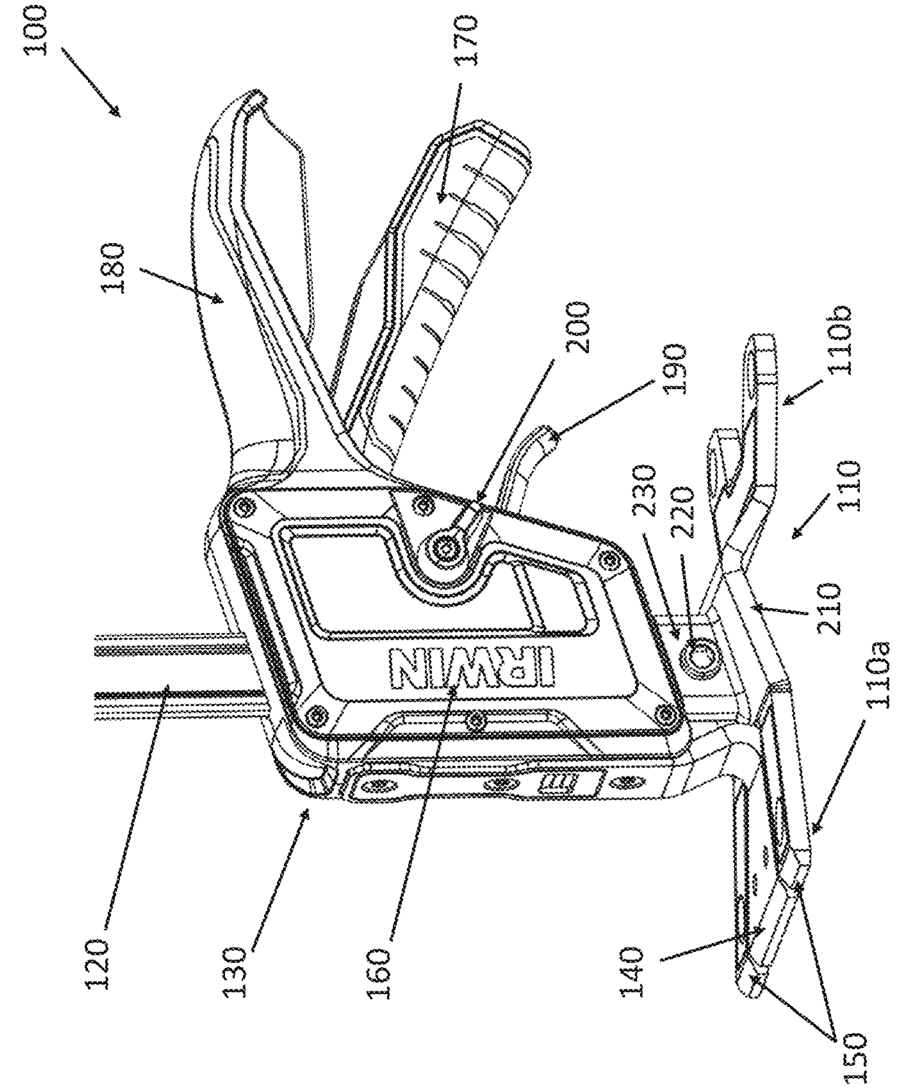
FIG. 1 illustrates a side perspective view of a lifting and lowering tool according to a first embodiment.

As shown in FIG. 1, the tool may include a foot 110 having a front foot 110*a* and a rear foot 110*b* that are fixedly mounted to a bar 120. A movable assembly 130 may be movably mounted to the bar 120, and includes a movable platform 140 that is received between toes 150 of the front foot 110*a*. It may be appreciated that the front foot 110*a* and the movable platform 140 together may be placed under an object to be raised, and by actuating the movable assembly 130 the movable platform 140 may raise the object above the foot 110. Similarly, an object placed on an elevated movable platform 150 may be lowered by actuating the movable assembly 130 to lower the object to a desired location. Details of the foot 110 are discussed in greater detail below, but as shown in FIG. 1, the rear foot 110*b* may extend rearwards from the front foot 110*a* and may be sized to support the tool 100 and to stop the tool 100 from toppling backwards when the tool 100 is stood without any load, especially when the movable assembly 130 is raised from the foot 110 (e.g., being fully extended therefrom).

As further shown in FIG. 1, the movable assembly 130 includes a housing 160 and may include a lifting actuator 170, such as a lever, which may be actuated against a grip 180, a lowering actuator 190, such as another lever, and a release actuator 200, which could be a third lever, as further described herein. It may be appreciated that in some embodiments the lowering actuator 190 and the release actuator 200 may be ergonomically located. For example, the lowering actuator 190 may be actuatable by an extended fingertip from a hand grasping the grip 180 (less force being required to lower a raised load than to raise it) while the raising actuator 170 may be actuated by a plurality of curled fingertips as a user's hand extends from the grip 180. As shown, the release actuator 200 may have a low mechanical advantage, and may be positioned to reduce the possibility of accidental release when the movable assembly 130 is loaded by a raised object. In a non-limiting embodiment, operating the lowering actuator 190 lowers the movable platform approximately 3 mm.

While the embodiment of FIG. 1 shows the lowering actuator 190 and release actuator 200 positioned so that they are easily operated with a finger whilst the grip 180 is gripped in the hand, in other embodiments the lowering actuator 190 and release actuator 200 could be positioned at the top of the housing 160 so as to be operated by a thumb whilst the grip 180 is gripped in the hand.

As shown in FIG. 1, in an embodiment, the foot 110 may be formed from a base plate 210 that is fixed to the bar 120. In an embodiment, the foot 110 may be defined as beginning on the bar 120 where movement of the movable assembly 140 down the bar 120 is limited (e.g., by a stopper feature). As such, in an embodiment, a portion of the bar 120 may form a portion of the foot.

In the embodiment of FIG. 1, a fastener 220 may extend through the bar 120 and a flange 230 extending from and fixed to the base plate 210 to secure the bar 120 to the base plate 210 of the foot 110. In some embodiments, the base plate 210 may be arching or cranked upwards towards the extension of the bar 120. As shown in the bottom perspective view of FIG. 2, such an angled configuration may provide clearance for a connection point 240 such as a welded connection or other fastener between the bar 120 and foot/base plate 210 as the bar 120 extends through the base plate 210. Such a configuration may remove the need for extra finishing operations to make the weld or coupling flush with a bottom surface of the base plate 210.

Figure 2:
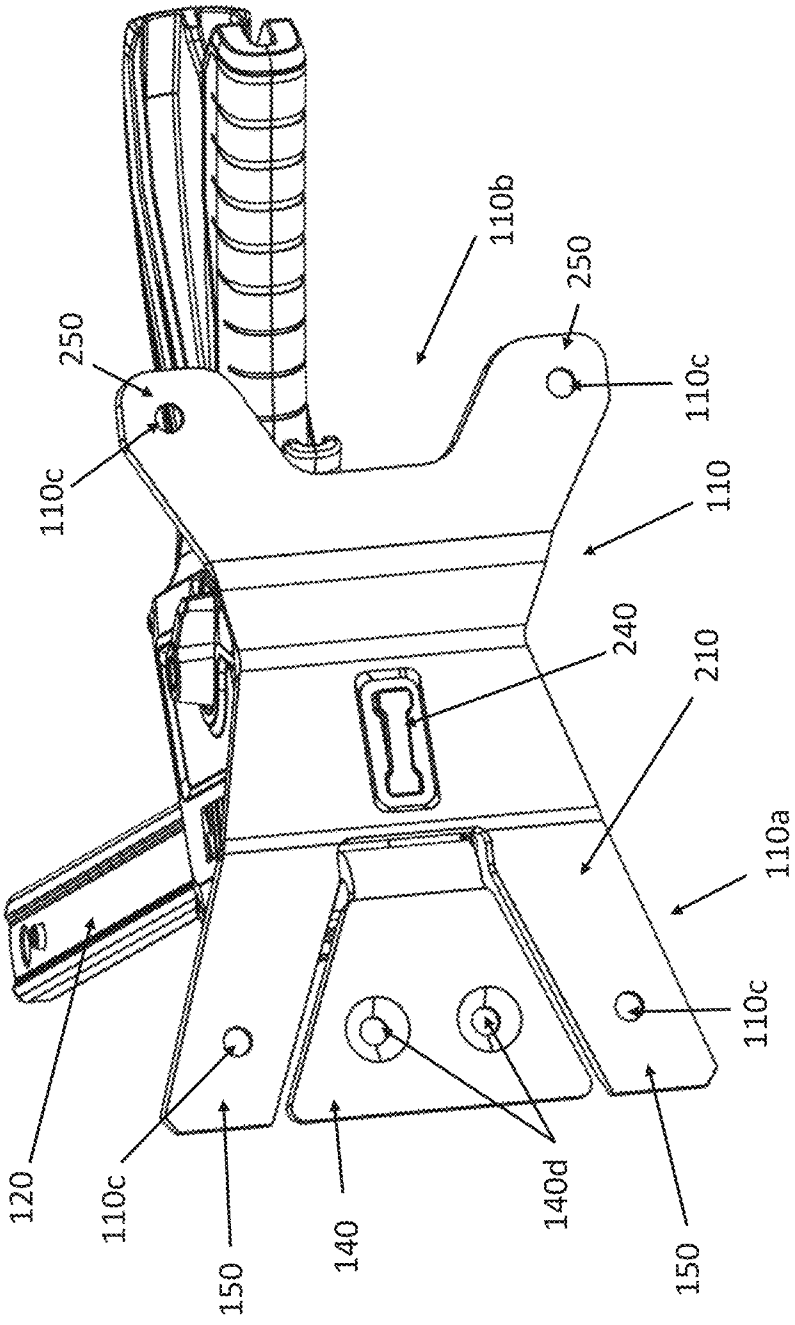
FIG. 2 illustrates a bottom perspective view of the tool of FIG. 1.

In some embodiments, the foot 110 may form a triangular configuration, where the toes 150 of the front foot 110*a* are splayed and meet a common rear foot 110*b*, such as is described and illustrated with reference to embodiments below. It may be appreciated that a having at least three points of surface contact (e.g., a triangular shape of the foot 110), gives a large footprint for improved stability on uneven surfaces. As shown in FIG. 2, in an embodiment the foot 110 may form a general H or X configuration with the toes 150 of the front foot 110*a* and toes 250 of the rear foot 110*b* together provide four points of surface contact for the foot 110. Similarly, in some embodiments the movable assembly 140 may have a generally triangular configuration where a portion away from the bar 120 is wider than a portion closer to the bar 120.

FIGS. 3-5C illustrate the internals of the movable assembly 130 (e.g., with the housing 160 omitted), according to an embodiment. Movement of the movable assembly 130 along the bar 120 may be understood with reference to these Figures.

Figure 3:
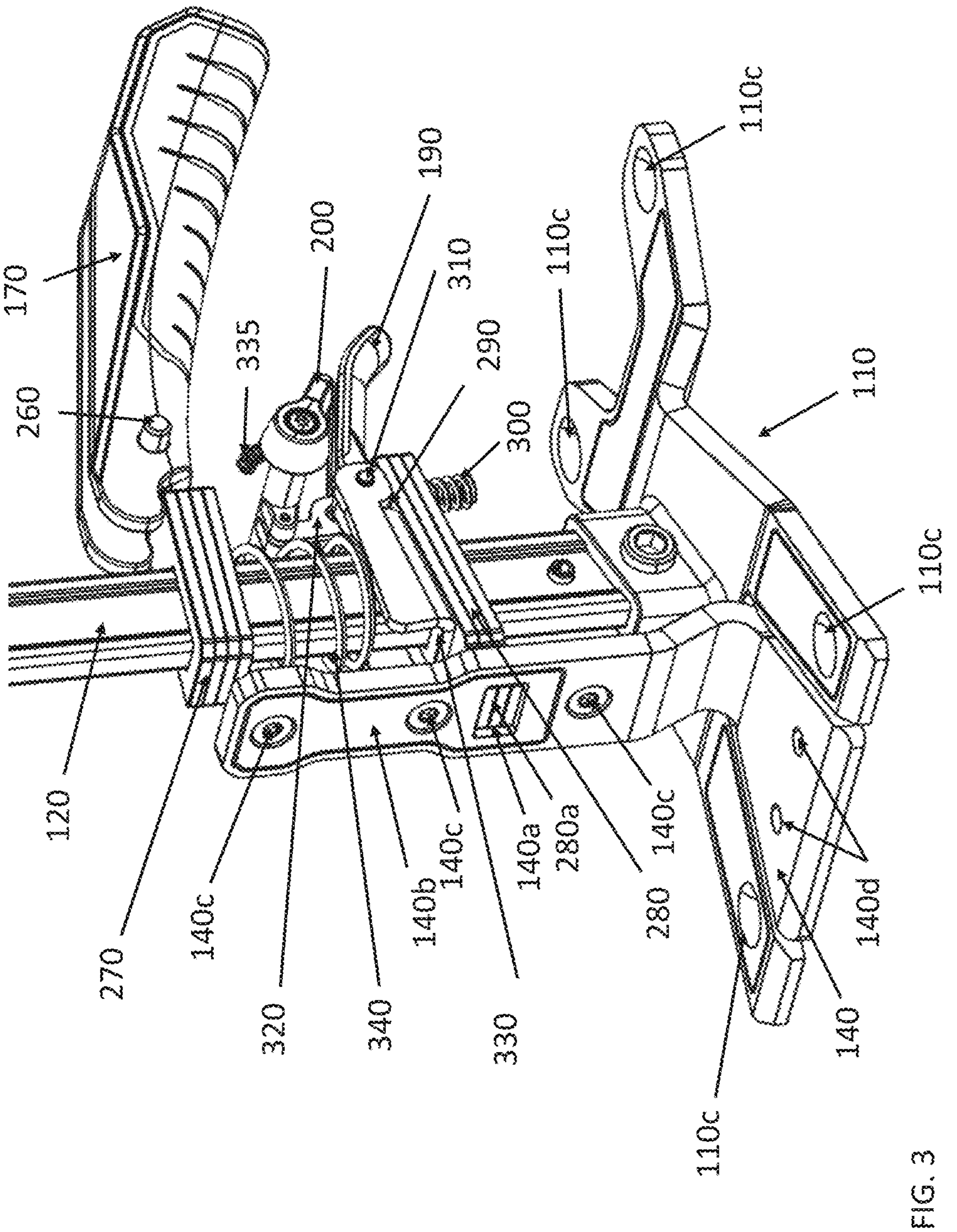
FIG. 3 illustrates a side perspective view of the tool of FIG. 1 with a housing thereof removed.

As shown in FIG. 3, the lifting actuator 170 pivots on a lifting actuator cross pin 260 that is attached to the housing 160 of the movable assembly 130. Operation of the lifting actuator 170 presses on lifting plates 270, which grip onto the bar 120, and move the housing 160 upwards. Locking plates 280 grip onto the bar 120 preventing the housing 160 from moving back down the bar 120. In the illustrated embodiment, as seen more clearly in FIG. 4, ends 280*a* of the locking plates 280 extend into an aperture 140*a* formed on an extension 140*b* of the movable platform 140 that is fixed to the housing 160, and as such, the movable platform 140 and the housing 160 maintain pressure on the locking plates 280.

It may be appreciated that as shown in FIG. 3, in some embodiments the flange 140*b* of the movable platform may include apertures 140*c* configured to receive fasteners therein to secure the movable platform 140 to the housing 160. Other connections may alternatively be possible, but regardless it may be understood that the flange 140*b* may be detachably coupled to housing 160 such that the movable platform 140 is detachable from the housing 160 in various embodiments. Such detachment may be advantageous in rotating the movable platform 140 to elevate the movable platform 140 above the foot 110 in some embodiments, or so that different configurations of movable platform 140 may be alternatively installed on the housing 160, for example.

Further seen in FIG. 3, as well as in FIG. 2, is that in some embodiments the foot 110 may include apertures 110*c* to facilitate securing the foot 110 to a support surface. Similarly, the movable platform 140 may include apertures 140*d* to facilitate securing the movable platform 140 to an object to be raised or lowered. As shown, in some embodiments, the apertures 110*c* and apertures 140*d* may be countersunk appropriately, such that a flat head fastener (e.g., as opposed to pan head fastener) may be received in each facing the appropriate direction to minimize protrusion and maintaining a flat configuration for the contacting surfaces of the foot 110 and the movable platform 140.

Figure 4:
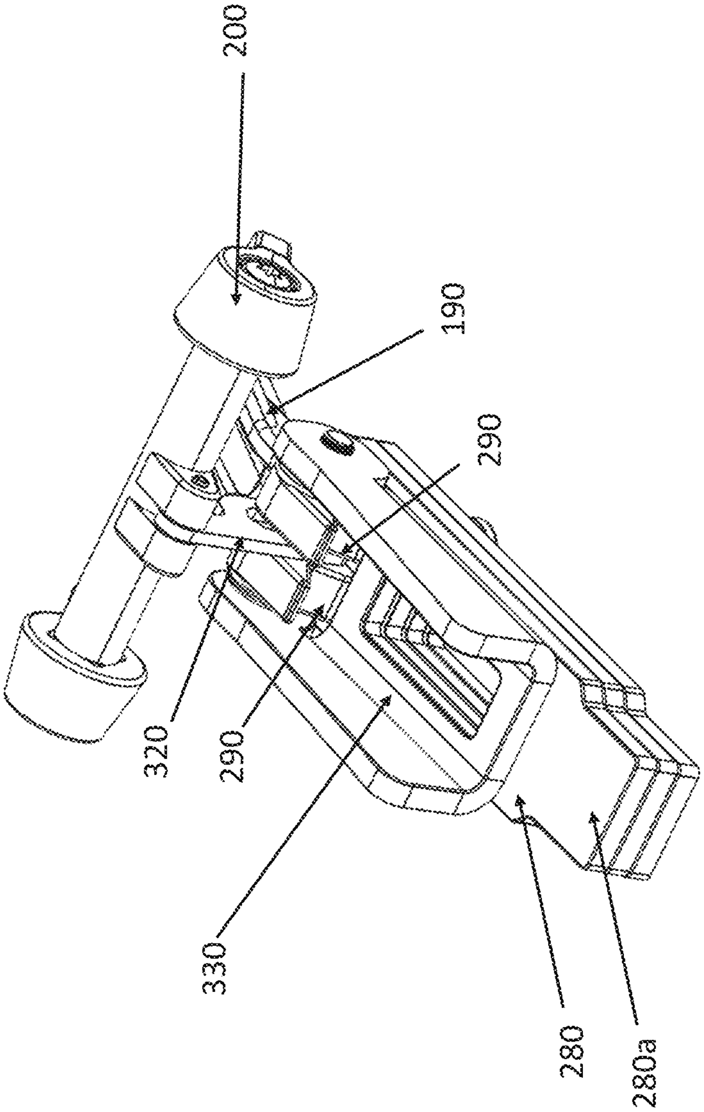
FIG. 4 illustrates an isolated perspective view of a lowering and release subassembly of the tool of FIG. 1.

A lowering actuator cam 290, seen more clearly in FIGS. 4 and 5, is actuated through movement of the lowering actuator 190, and operates the locking plates 280 for controlled lowering (in the illustrated embodiment may be in approximately 3 mm increments). The lowering actuator cam 290 and the locking plates 280 may be spring biased against the housing 160 by a spring 300, and the lowering actuator 190 and the lowering actuator cam 290 may be pivotal on the housing at a lowering actuator pivot 310. As further shown in FIG. 3, and described in greater detail below, the release actuator 200 may pivot or actuate a release actuator cam 320, which operates both a holding plate 330 and the locking plates 280, disengaging the holding plate 330 and the locking plates 280 from the bar 120 and allowing free movement of the movable assembly 130 along the bar 120, which would fully release a load being supported on the movable platform 140. As shown, the release actuator 200 may be spring biased (bearing against the housing 160) by release actuator spring 335, such that release of the release actuator 200 automatically moves into an un-released position. It may be appreciated that a spring 340 between the holding plate 330 and the lifting plates 270 biases the relative relationship between the lifting plates 270 and the holding plate 330 to permit walking the movable assembly 130 along the bar 120 and holding in an elevated position. Similarly, the spring 300 between the locking plates 280 and the housing 160 prevent unintended lowering of the load until incrementally moved by the lowering actuator 190, or release by the release actuator 200.

As shown in FIG. 4, depicting the holding plate 330, the locking plates 280, the release actuator 200, and the lowering actuator 190 in isolation, operating the release actuator 200 disengages the holding plate 330 and the locking plates 280 from the bar 120, allowing free movement of the movable assembly 130 up or down the bar 120 (omitted from the isolated subassembly depicted, but understood as passing through the apertures of the holding plate 330 and locking plates 280). As shown, the release actuator cam 320 may be received in a gap 340 between a pair of lowering actuator cams 290 in some embodiments, so that the release actuator cam 320 may act directly on the holding plates 280.

Figure 5A:
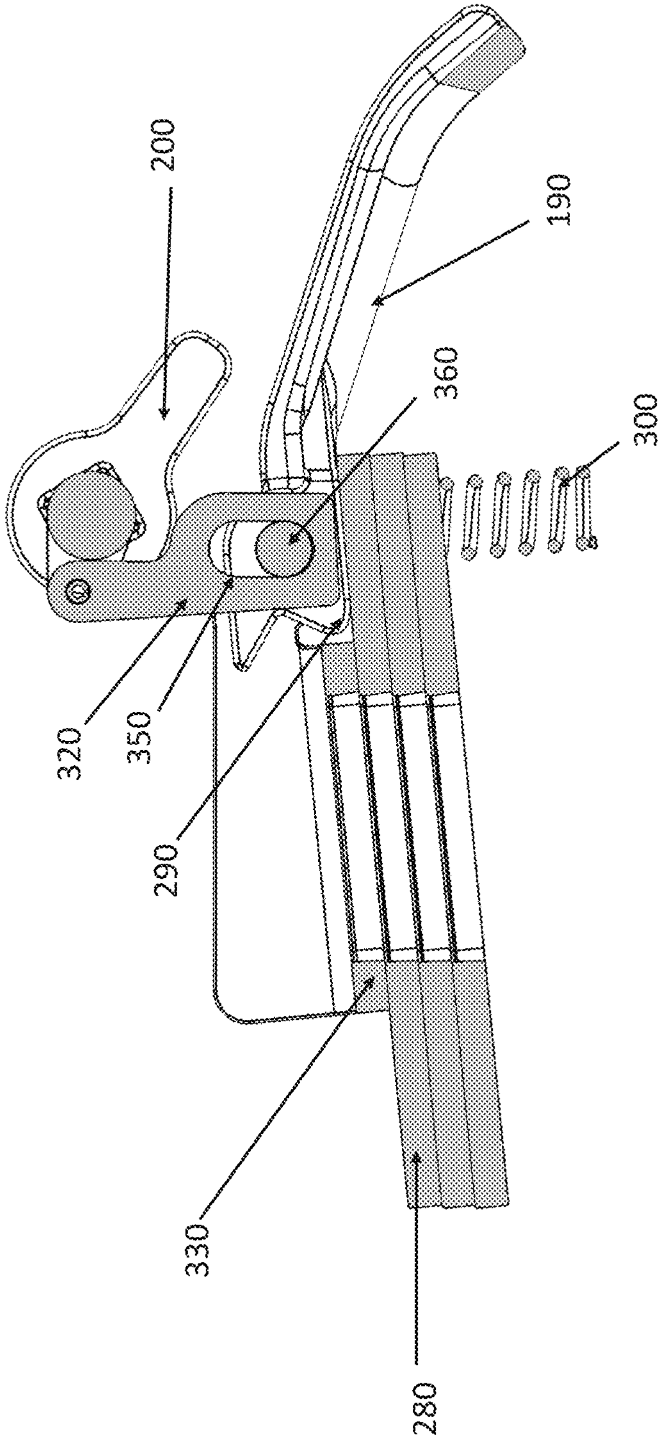
FIG. 5A-FIG. 5C illustrate a side cross sectional view of the subassembly of FIG. 4, in neutral, incremental lowering, and released positions respectively.
Figure 5B:
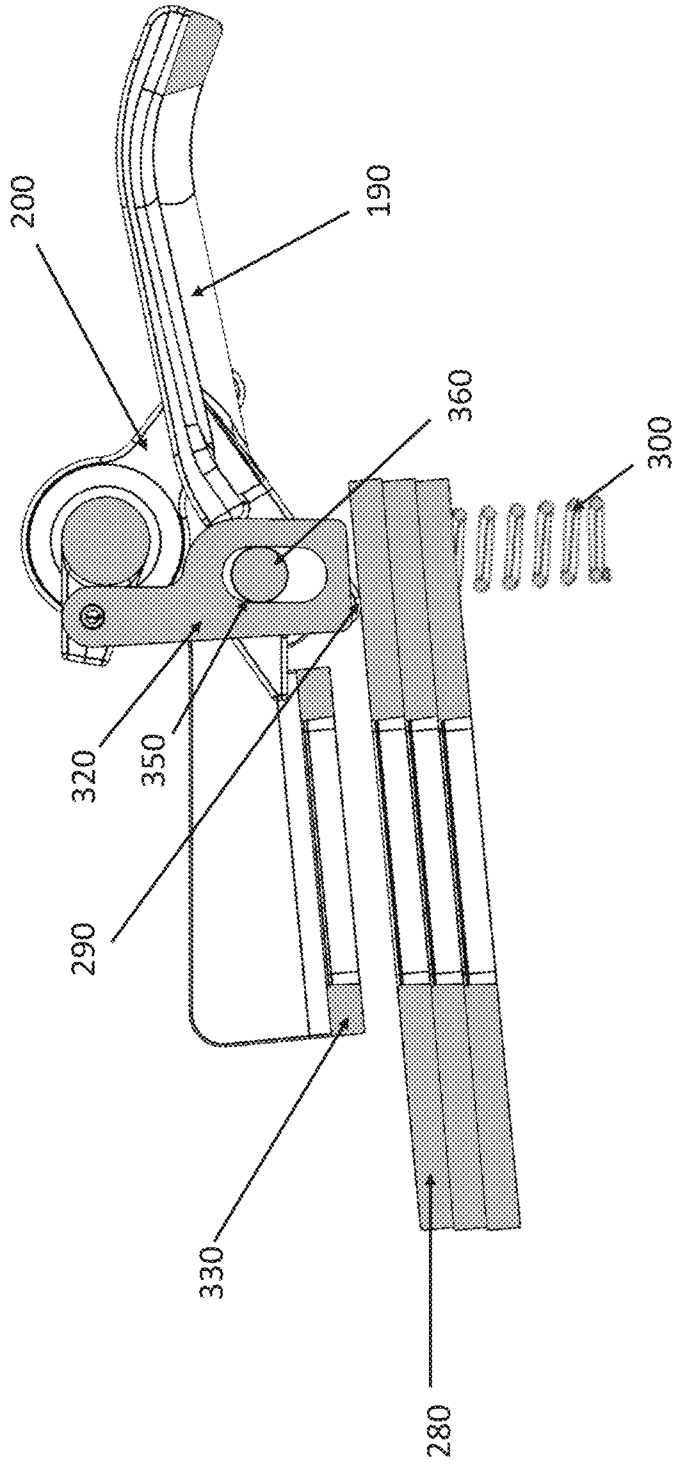
Figure 5C:
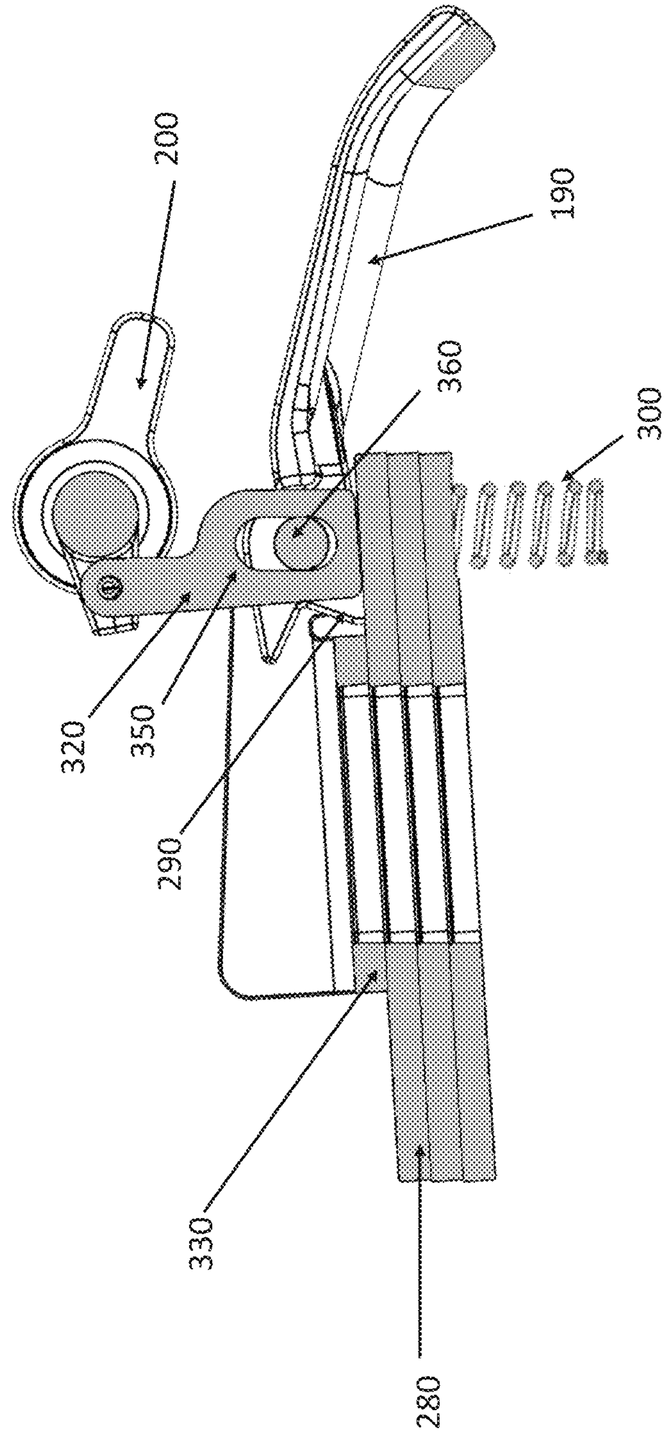

The relative operations of the lowering actuator 190, the release actuator 200, and the locking plates 280 and the holding plate 330 may be better understood with reference to FIGS. 5A-5C, depicting cross sectional views bisecting the subassembly shown in isolation in FIG. 4. FIG. 5A illustrates the subassembly at rest, as holding onto the bar 120. As shown in FIG. 5B, pulling on or otherwise rotating the lowering actuator 190 causes the lowering actuator cams 290 to press on the locking plates 280 and pulling the bar 120 upward, moving the movable assembly 130 down towards the foot 110. As the holding plate 330 remains engaged on the bar 120, movement is limited to the aforementioned increment. As shown in FIG. 5C, however, actuating or in the illustrated embodiment the rotating the release actuator 200 in a counterclockwise direction (e.g., lifting it away from the lowering actuator 190) pushes down on the release actuator cam 320, which pushes against the holding plates 280, and by virtue of the engagement between the holding plate 330, the release lever cam 320, and an aperture 350 in the release actuator cam 320 that allows a pivot 360 for the lowering actuator 190 to not be impacted by the movement of the release actuator cam 320, actuating the release actuator 200 causes disengagement of both the holding plate 330 and the lowering plates 280, such that the movable assembly 130 freely moves along the bar 120 without being limited to the incremental movement.

Figure 6:
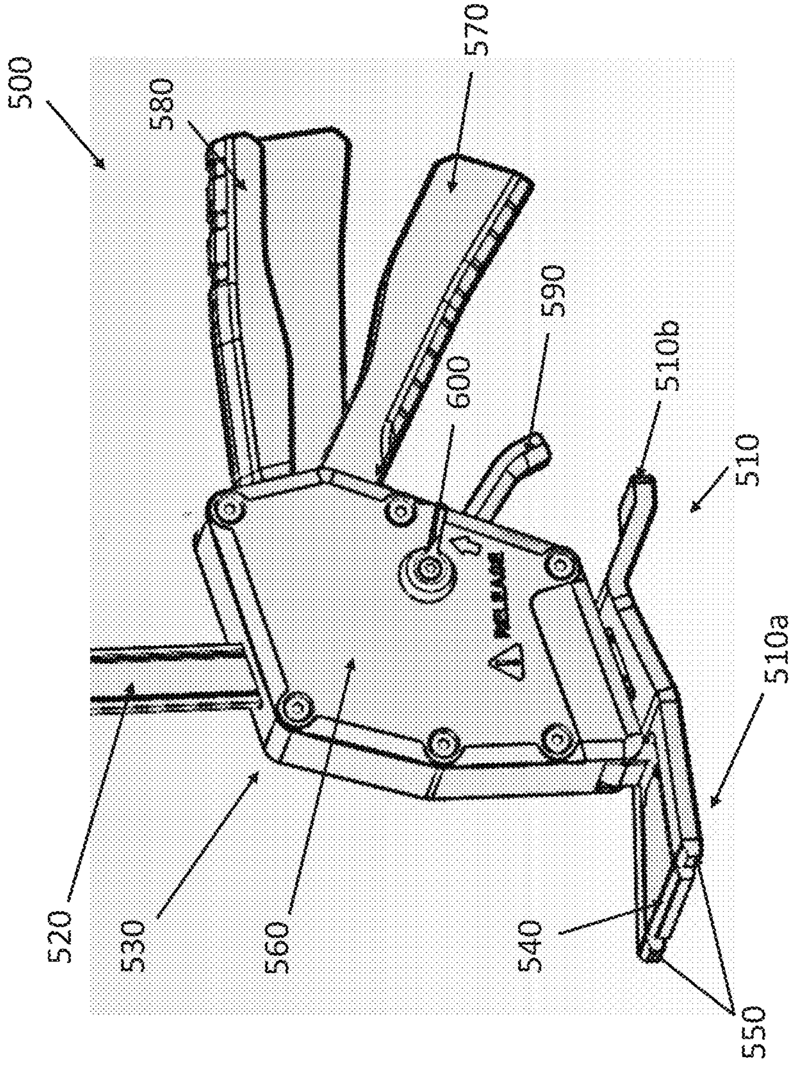
FIG. 6 illustrates a side perspective view of a lifting and lowering tool according to a second embodiment.
Figure 7:
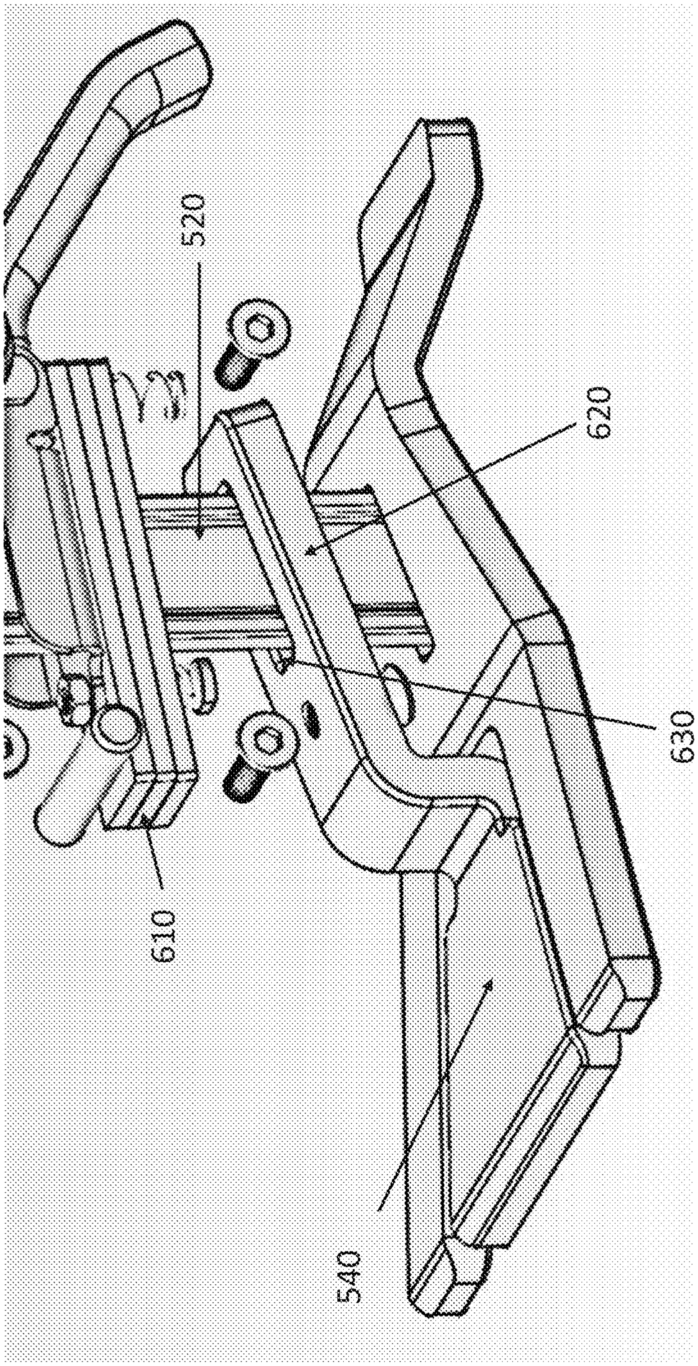
FIG. 7 illustrates a side perspective view of the tool of FIG. 6 with a housing thereof removed, focusing on a movable platform thereof.

As illustrated in FIGS. 6-8, in another embodiment a lifting and lowering tool 500 may be generally similar to other lifting and lowering tools disclosed herein, except as noted. As shown, the lifting and lowering tool 500 may include a foot 510 that include features similar to those described as to foot 110, such as a front foot 510*a* similar to front foot 110*a*. As shown in the illustrated embodiment, however, in some embodiments rear foot 510*b* may be being unitary while front foot 510*a* is splayed, such that front foot 510*a* and rear foot 510*b* form a tripod forming three points of contact on a support surface. As further shown, extending from the foot 510 is bar 520, which may be generally similar to bar 120. Movable assembly 530 may be configured to move along the bar 520, and support a movable platform 540 that when in a lowered position is received between toes 550 of the front foot 510*a*, and when raised alongside a housing 560 of the movable assembly 530 may lift a load. As described in greater detail below, raising the movable assembly 530 may be accomplished through actuating a raising actuator 570, which may be pulled against a grip 580 formed with the housing 560 or extending from the housing 560. Similarly, lowering the movable assembly 530 may be accomplished by actuating lowering actuator 590 which may incrementally lower the movable assembly. Fully releasing the movable assembly 530 may be accomplished by actuating a release actuator 600.

Turning to FIG. 7, depicting portions of the movable assembly 530 with the housing 560 removed, it may be appreciated that in some embodiments, the movable platform 540 is separately carried on the bar 520, and would be coupled to the locking plates 610 (described in greater detail below) by the housing 560. As shown, such a movable platform 540 may extend from a movable platform flange 620 which may envelop the bar 520. For example, a generally rectangular hole 630 may be formed in the movable platform flange 620. It may be appreciated that should the connection between the housing 560 and the movable platform 540 fail in operation, this hole 630 and the angled connection between the bar 520 and the hole 630 allows the movable platform 540 to lock onto the bar 520, preventing the load from lowering suddenly. Accordingly, in some embodiments, the flange 620 may act as a locking plate 610 if the movable platform 540 were to separate from the housing 560 (e.g., from failure of the housing 560 or fasteners coupling the movable platform 630 and/or the flange 620 to the housing 560 (e.g., supporting the movable platform 630 and/or the flange 620 to move with the movable assembly).

Figure 8B:
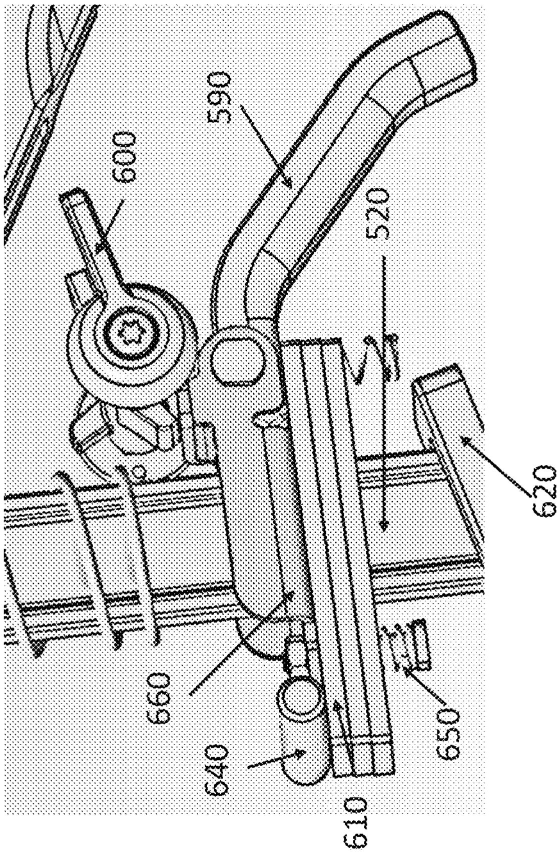
FIG. 8A-FIG. 8B illustrate a side perspective view of the tool of FIG. 6 with a housing thereof removed, focusing on lowering and release actuators thereof, in incremental lowering and released positions respectively.
Figure 8A:
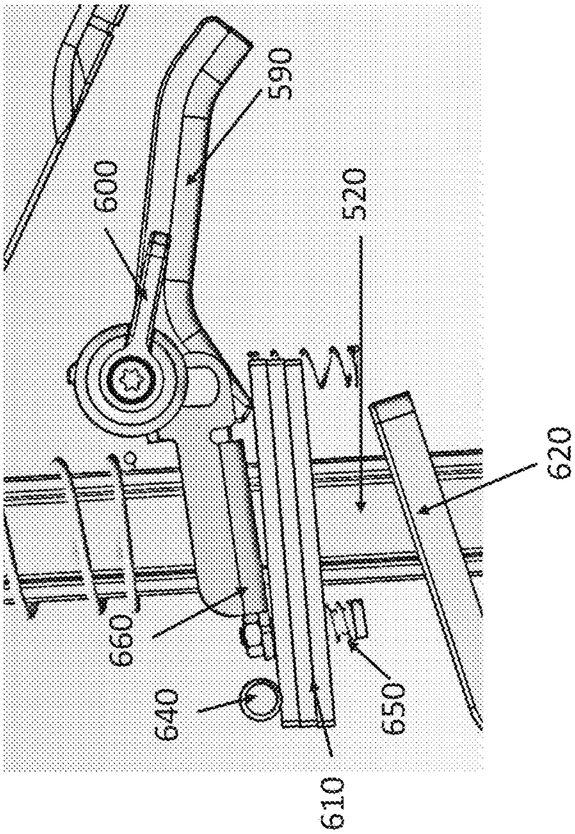

While the movable assembly 530 may include a lifting actuator generally similar to the lifting actuator 170 described above, it may be appreciated that in some embodiments the mechanism of a lowering actuator or release actuator may differ from that of lowering actuator 190 and release actuator 200. For example, as illustrated in FIGS. 8A and 8B, where the movable platform 540 is separately carried on the bar 520 and coupled to the locking plates 610 by the housing 560 such as in the case of the lifting and lowering tool 500, a locking plates cross pin 640 or other bearing feature may be connected to the housing 560 and maintain pressure on the locking plates 610. As further shown, a pin and spring connection 650 between a holding plate 660 and the locking plates 610 may be provided to appropriately bias the locking plates 610 relative to the holding plate 660, and provide a flexible connection between the holding plate 660 and the locking plates 610. As such, in embodiments including the pin and spring connection 650 between the holding plate 660 and the locking plates 610, the lowering actuator 590 actuates by disengaging the locking plates 610 from the bar 520 while maintaining the holding plate 660 action on the bar 520. As noted in above, operating the lowering actuator 590 may lower the movable assembly 530 approximately 3 mm. This amount is determined by the lowering actuator cam 670 coupled to the lowering actuator 590 pressing on the locking plates 610 to walk the movable assembly towards the foot 510. It may be appreciated that the approximately 3 mm movement of the illustrated embodiment is based on the relative size of the actuator arm, plates and the bar, and that other incremental lowering amounts may be utilized by increasing or decreasing the throw of the cam on the lowering actuator. Similarly, the release actuator 600 is shaped to, when actuated, press on the holding plate 660 and the locking plates 610, so as to disengage them from the bar 520 and allow free movement of the movable assembly 530 along the bar 520.

FIGS. 9-13 show another embodiment of the present disclosure, configured to use a common lifting and lowering actuator.

Figure 9:
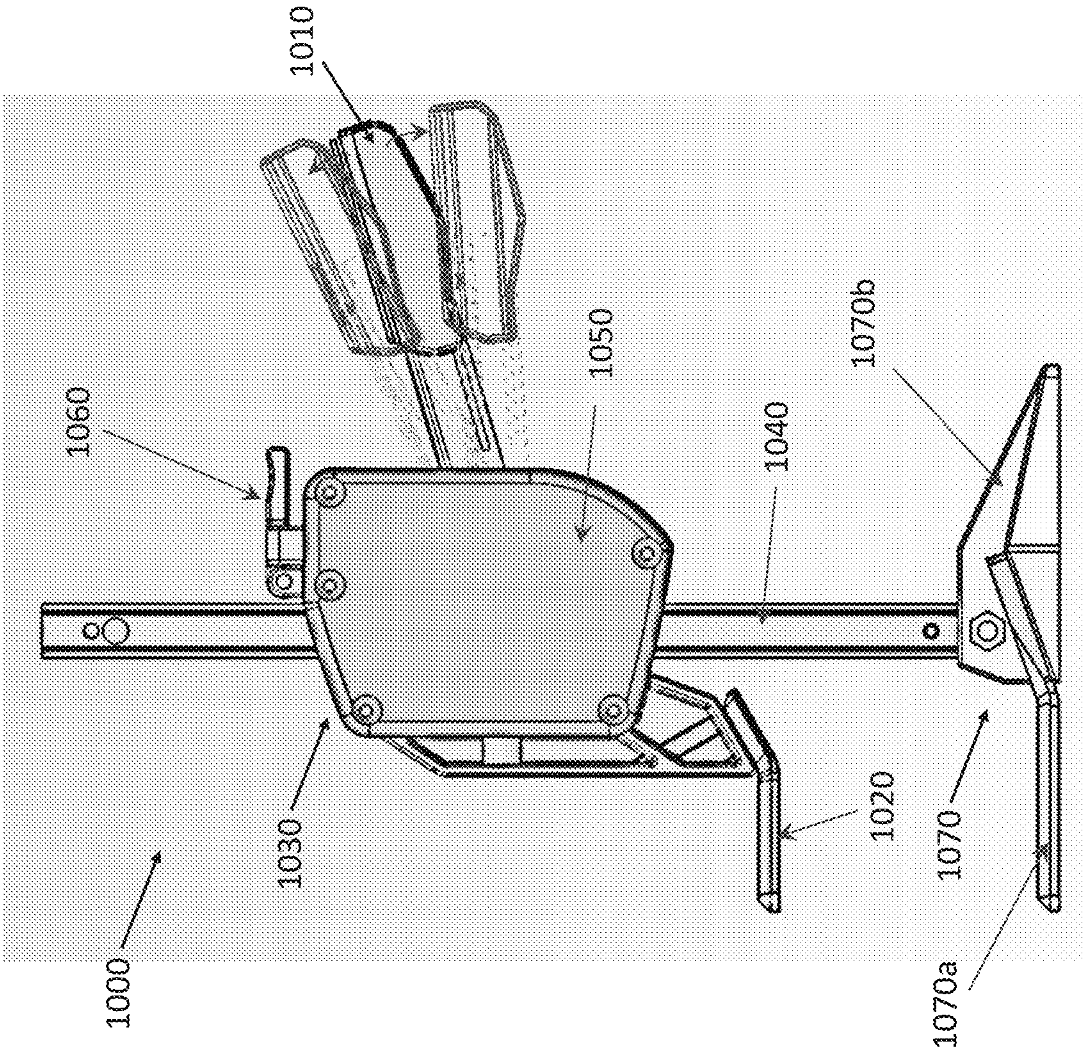
FIG. 9 illustrates a side view of a lifting and lowering tool according to a third embodiment.

As shown in FIG. 9, a lifting and lowering tool 1000 may include a trigger actuator 1010 that may be pushed down from a neutral position to raise a movable platform 1020 of a movable assembly 1030 along a bar 1040, or may be raised up from a neutral position for incremental lowering of the movable assembly 1040 (and thus the movable platform 1020) down the bar 1040. Similar to the movable assemblies of other embodiments described herein, the movable assembly 1030 may include a housing 1050 from which the movable platform 1020 is coupled to, and from which the trigger actuator 1010 extends. In some embodiments, It may be appreciated that a stationary grip extending from the housing 1050 and configured to be engaged when pushing the trigger actuator 1010 down towards it may provide a more stable feel for the user, and offer the option of squeezing the trigger down versus simply pushing the trigger down, regardless of if such stationary grip is not utilized when lifting the trigger actuator 1010 up to incrementally lower the movable platform 1020.

As further described herein, a separate release actuator 1060 may be provided and required to be pressed to fully release engagement of the movable assembly 1030 from the bar 1040. As shown, the full release actuator 1060 may be spaced from and separated from the trigger actuator 1010 so as to prevent inadvertent full release, which could drop a load supported by the movable platform 1020. While in some embodiments the lifting and lowering tool 1000 may include a foot similar to the foot 110, in an embodiment, the foot may differ as shown. As seen in FIG. 9, a foot 1070 may include a front foot 1070*a* and a rear foot 1070*b*, where the front foot 1070*a* may be removably attached to the rear foot 1070*b* to allow for replacement or attachment of alternate configuration of the base plate to reshape the foot.

Figure 10:
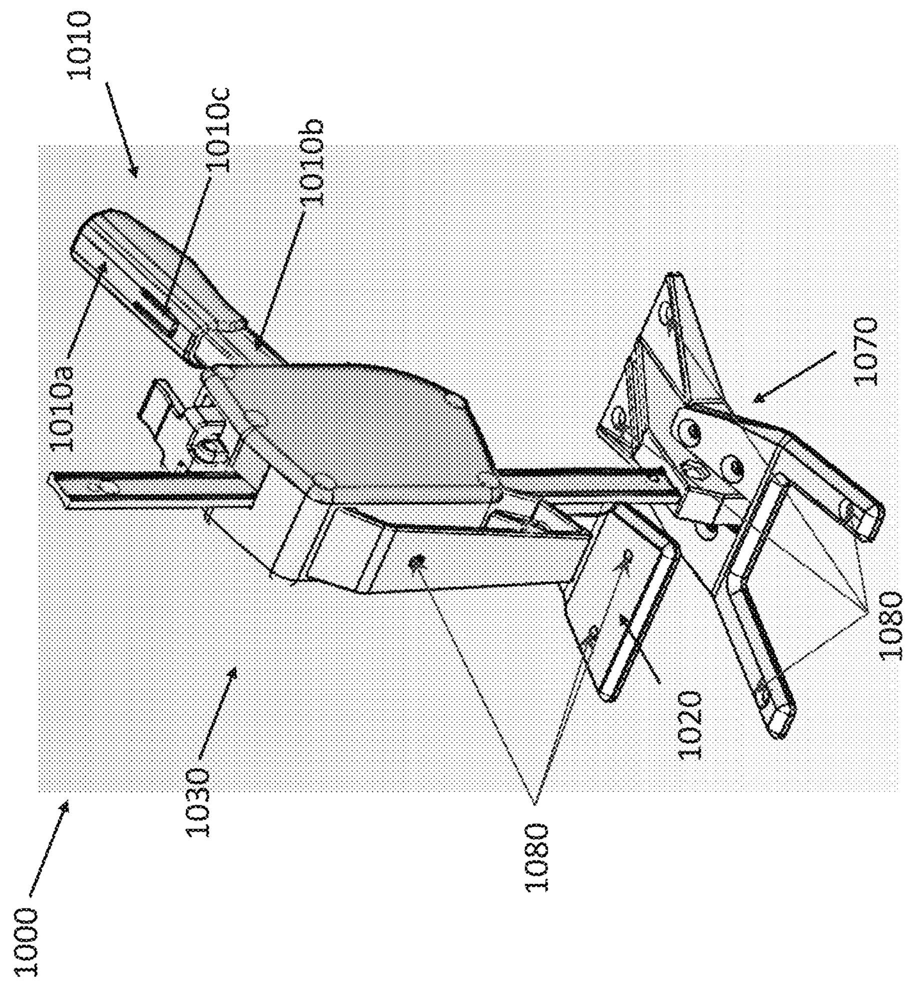
FIG. 10 illustrates a side perspective view of the lifting and lowering tool of FIG. 9.

As seen in the perspective view of the lifting and lowering tool 1000 of FIG. 10, in some embodiments one or more of the movable assembly 1030 and the foot 1070 may have holes 1080 to allow the lifting and lowering tool 1000 to be rigidly attached to another object. In an embodiment, holes 1080 in the movable assembly 1030 or the movable platform 1020 thereof may be added to allow users to attach extensions or other custom-made additions to suit their particular needs. In an embodiment, the handle on the trigger actuator 1010 could be extendable to allow for additional leverage when raising the movable assembly. For example, an outer handle 1010*a* may be slidable relative to an inner handle 1010*b*, interlocking but selectively releasable via a handle actuator 1010*c*.

Figure 11:
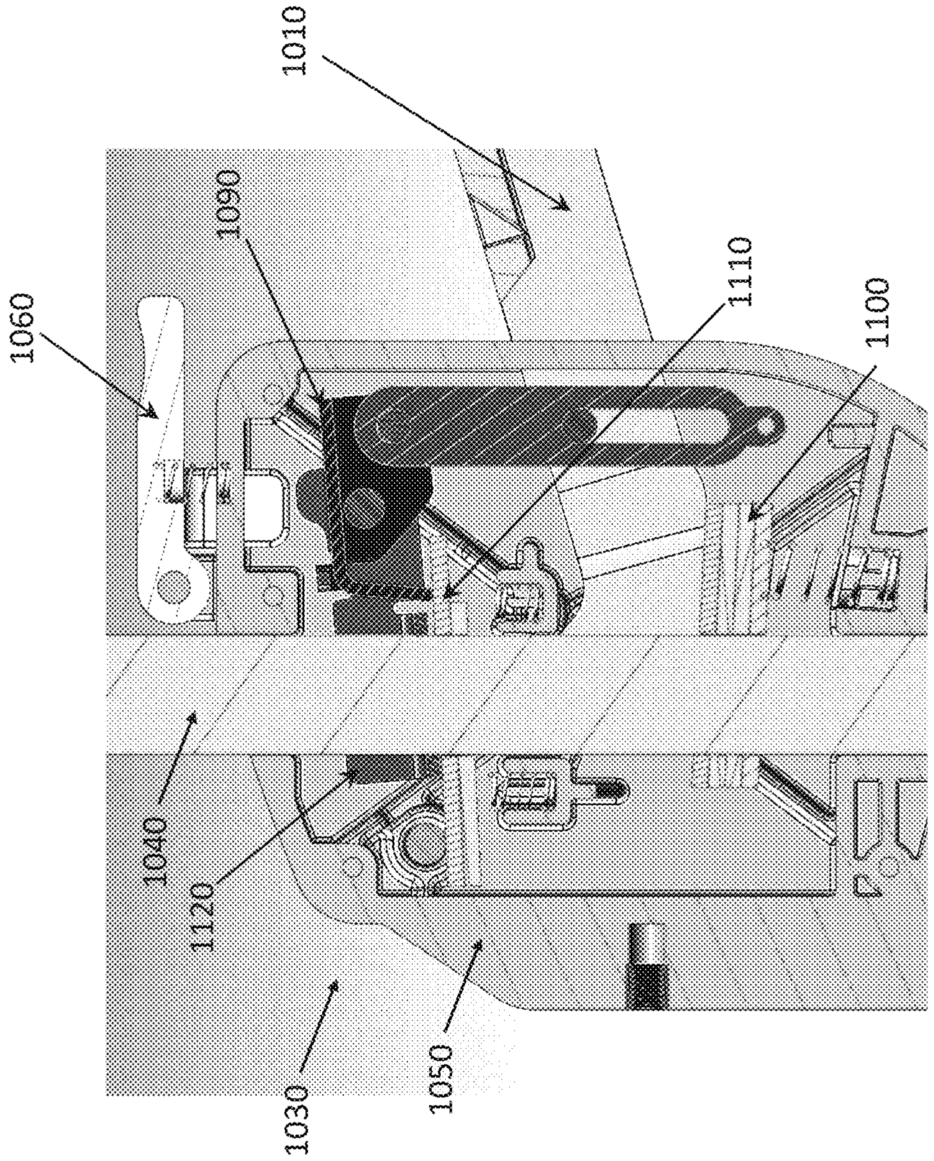
FIG. 11 illustrates a cross sectional view of the embodiment of FIG. 9, showing the internal mechanism when the tool is at rest, and how pushing down on an actuator arm thereof would actuate lifting.

An embodiment of the movable assembly 1030 is depicted in FIG. 11 as a cross sectional view inside the housing 1050. As shown, the trigger actuator 1010 and release actuator 1060 as received within the housing 1050 are depicted. As shown, the engagement of the trigger actuator 1010 as alternatively actuating both lifting and lowering of the movable assembly 1030 may be appreciated through engagement between the trigger actuator 1010 and an internal lowering actuator 1090, and between the trigger actuator 1010 and the lifting plates 1100, or the internal lowering actuator 1090 and the locking plates 1110 and/or holding plate 1120.

Figure 12:
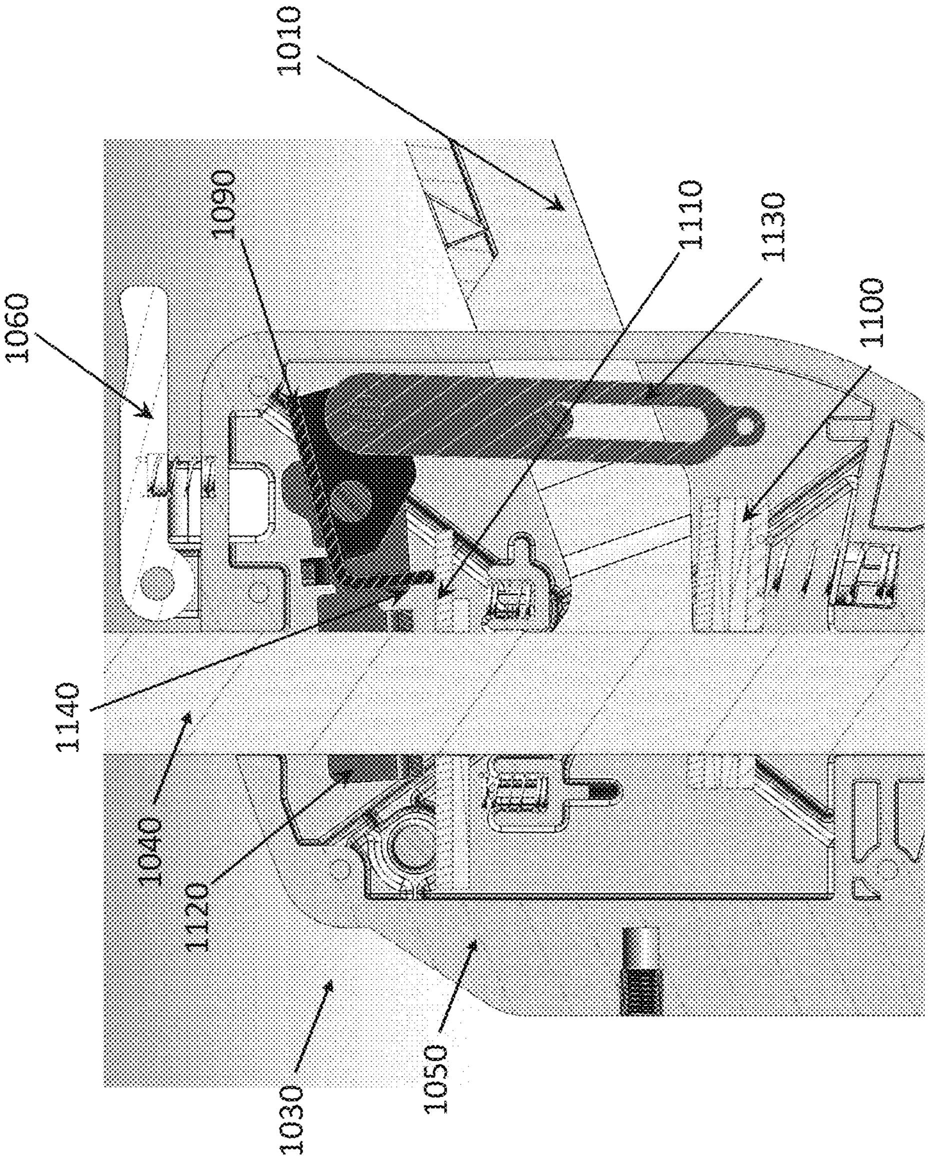
FIG. 12 illustrates a cross sectional view of the embodiment of FIG. 9, showing the internal mechanism when the tool is at actuated by lifting on the actuator arm to actuate lowering.

As shown in FIG. 12, when the trigger 1010 is raised to actuate lowering the movable assembly 1030, a lowering mechanism linkage 1130 between the trigger actuator 1010 and lowering actuator 1090 is also raised. This causes the lowering actuator 1090 to rotate, and a cam/contact point 1140 presses down on the locking plates 1110 and slightly raising the holding plate 1120. This allows the locking plates 1110 to be pushed down the bar 1040, incrementally lowering the movable assembly 1030, while the holding plate 1120 is raised to grip the bar 1120 and prevent full release of the load.

Figure 13:
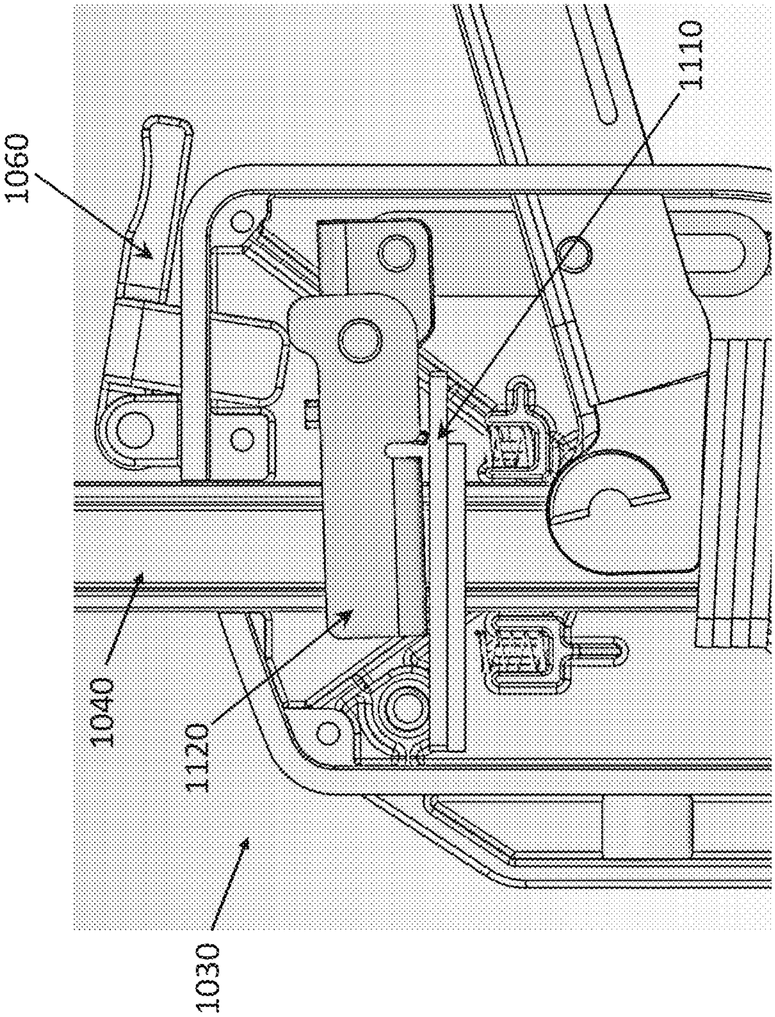
FIG. 13 illustrates a side view of the embodiment of FIG. 9 with a side of the housing removed, showing the internal mechanism when the tool is actuated by pressing on a release button to actuate release of a load carried by the tool.

FIG. 13 shows an embodiment of actuation of the release actuator 1060 of the lifting and lowering tool 1000. As shown, pressing down on the release actuator 1060 disengages the holding plate 1120 and the locking plates 1110 from the bar 1040, allowing free movement of the movable assembly 1050 along the bar 1040. It would be understood that while under load, or while unsupported by a user, gravity would pull the movable assembly 1030 down the bar 1040.

Figure 14:
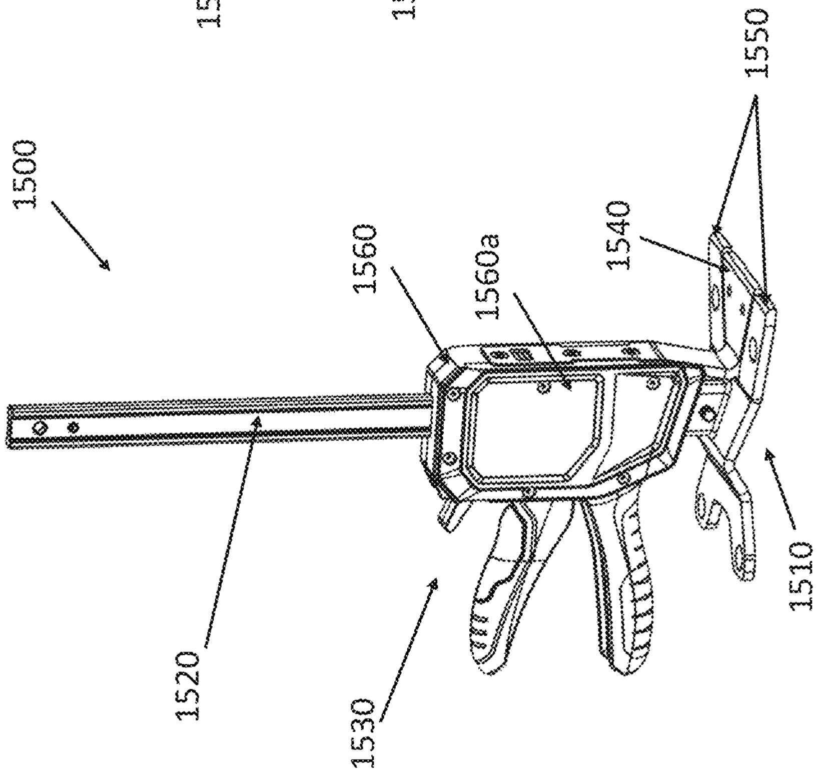
FIG. 14 illustrates a side perspective view of a lifting and lowering tool according to a fourth embodiment.

FIGS. 14-17C illustrate another embodiment of a lifting and lowering tool, namely lifting and lowering tool 1500. As shown in FIG. 14, the lifting and lowering tool 1500 includes a foot 1510 that is fixedly mounted to a bar 1520. It may be appreciated that the foot 1510 and bar 1520 may be generally the same as the bar 110 and bar 120 described herein, or may be similar to the foot 510 and bar 520, or may be similar to the foot 1070 and bar 1040, or combinations thereof. A movable assembly 1530 may be movably mounted to the bar 1520, and includes a movable platform 1540 that may be received between toes 1550 of the foot 1510.

Figure 15:
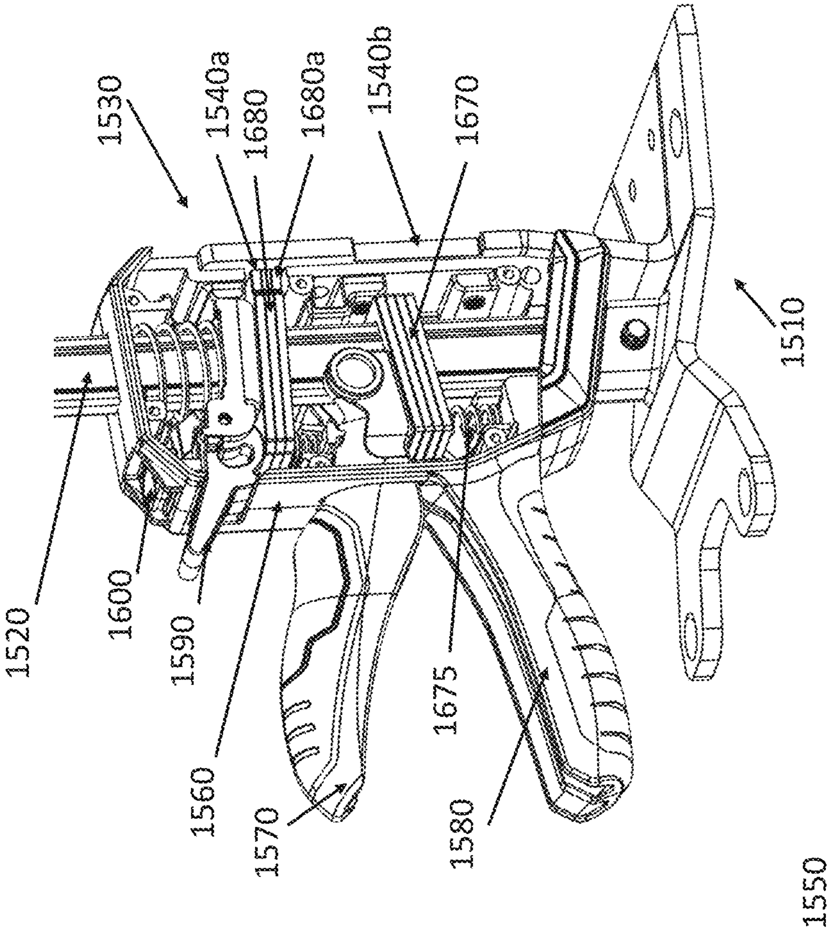
FIG. 15 illustrates a side perspective view of the lifting and lowering tool of FIG. 14, with a cover of a housing thereof removed to view an interior.

FIG. 15 shows another perspective view of the tool 1500, with a housing 1560 of the movable assembly 1530 having a cover portion 1560*a* (as seen in FIG. 14) removed to show the interior thereof. As shown, a lifting actuator 1570, such as a lever, may extend from the housing 1560, and may be actuated against a grip 1580 fixed or formed with the housing 1560. In the illustrated embodiment, the lifting actuator 1570 is configured to be pushed in a downward direction to lift the movable platform 1540. It may be appreciated that such a configuration may permit a user to leverage their body weight, either applied through a hand or even a foot, to assist in lifting a load on the movable platform 1540. As further shown in FIG. 15, the tool 1500 includes a lowering actuator 1590, such as another lever, and a release actuator 1600, which could be an actuator button as shown, or could be another lever such as may be appreciated with reference to the other embodiments described herein.

It may be appreciated that the lifting actuator 1570 acts on lifting plates 1670, incrementally raising the movable platform 1540 along the bar 1520, similar to other embodiments described herein, albeit with the lifting plates 1670 angled and beating against the housing 1560 so that downward action of the lifting actuator 1570 towards the foot 1510 raises the movable assembly 1530 away from the foot 1510. A spring 1675 bears between the lifting plates 1670 and the housing 1560 to act as a return bias for the lifting lever 1570 and facilitate the incremental walking action for the lifting plates 1670.

As described in greater detail below, the lowering actuator 1590 and the release actuator 1600 may engage with locking plates 1680. As shown, the locking plates 1680 include ends 1680*a* that extend into an aperture 1540*a* formed on an extension 1540*b* of the movable platform 1540 that is fixed to the housing 1560. This may be understood as similar to the configuration of the locking plates 280 in relation to the movable platform 140 of the tool 100, albeit opposite in position as engaging the bar 1520 as illustrated. As such, it may be appreciated that the movable platform 1540 and the housing 1560 maintain pressure on the locking plates 1680 with such a connection.

Figure 16:
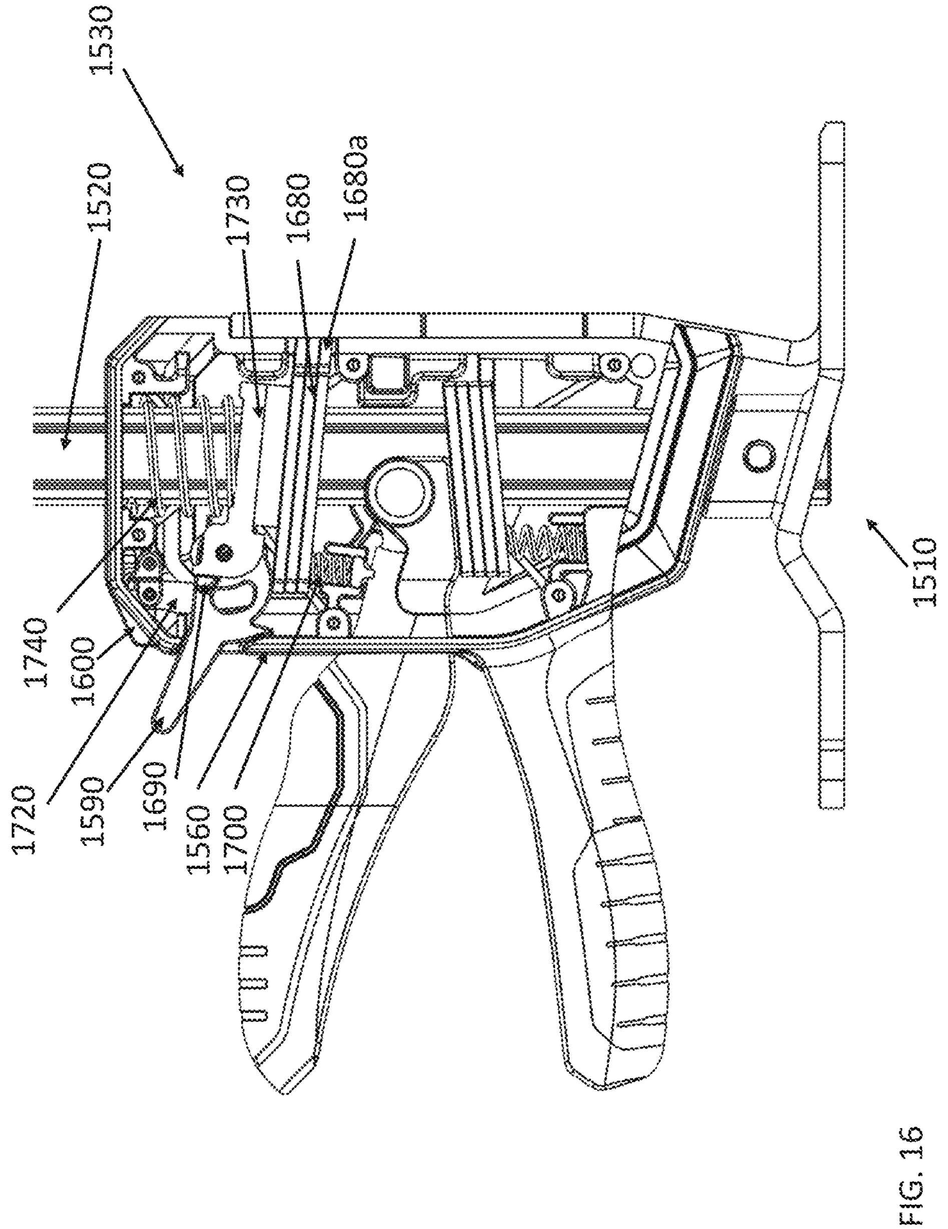
FIG. 16 illustrates a side view of the lifting and lowering tool of FIG. 14, with a cover of a housing thereof removed to view the interior.

Features of the lowering actuator 1590, the release actuator 1600, and the operation thereof may be understood with reference to FIG. 16 and FIGS. 17A-C. Specifically, as shown in FIG. 16, a lowering actuator cam 1690 is actuated through movement of the lowering actuator 1590, and presses on the locking plates 1680, moving the locking plates 1680 and the bar 1520 relative to a holding plate 1730 for controlled lowering of the movable assembly 1530 towards the foot 1510 (in the illustrated embodiment may be in approximately 3 mm increments). The locking plates 1680 may be spring biased against a portion of housing 1560 by a spring 1700. In an embodiment this may in turn spring bias the lowering actuator 1590, while in other embodiments, such as that illustrated, a torsion spring (e.g., torsion spring 1760 described below) on the lowering actuator 1590 may bias the lowering actuator 1590 into an unactuated position. The spring 1700 between the locking plates 1680 and the housing 1560 prevent unintended lowering of the load until incrementally moved by the lowering actuator 1590, or release by the release actuator 1600. While in some embodiments the lowering actuator 1590 and the lowering actuator cam 1690 may be pivotal on the housing 1560, in the illustrated embodiment the lowering actuator 1590 is linked to the release actuator 1600 as described below, which is borne by the housing 1560. As shown, the release actuator 1600 may actuate a release actuator cam 1720, which causes both the holding plate 1730 and the locking plates 1680 to disengage from the bar 1520 and allowing free movement of the movable assembly 1530 along the bar 1520, which would fully release a load being supported on the movable platform 1540. It may be appreciated that a spring 1740 between the holding plate 1730 and the housing 1560 biases the holding plate 1730 and the locking plates 1680 to permit walking the movable assembly 1530 down the bar 1520 towards the foot 1510, and holding the movable assembly 1530 gripping the bar 1520 in an elevated position.

Figure 17A:
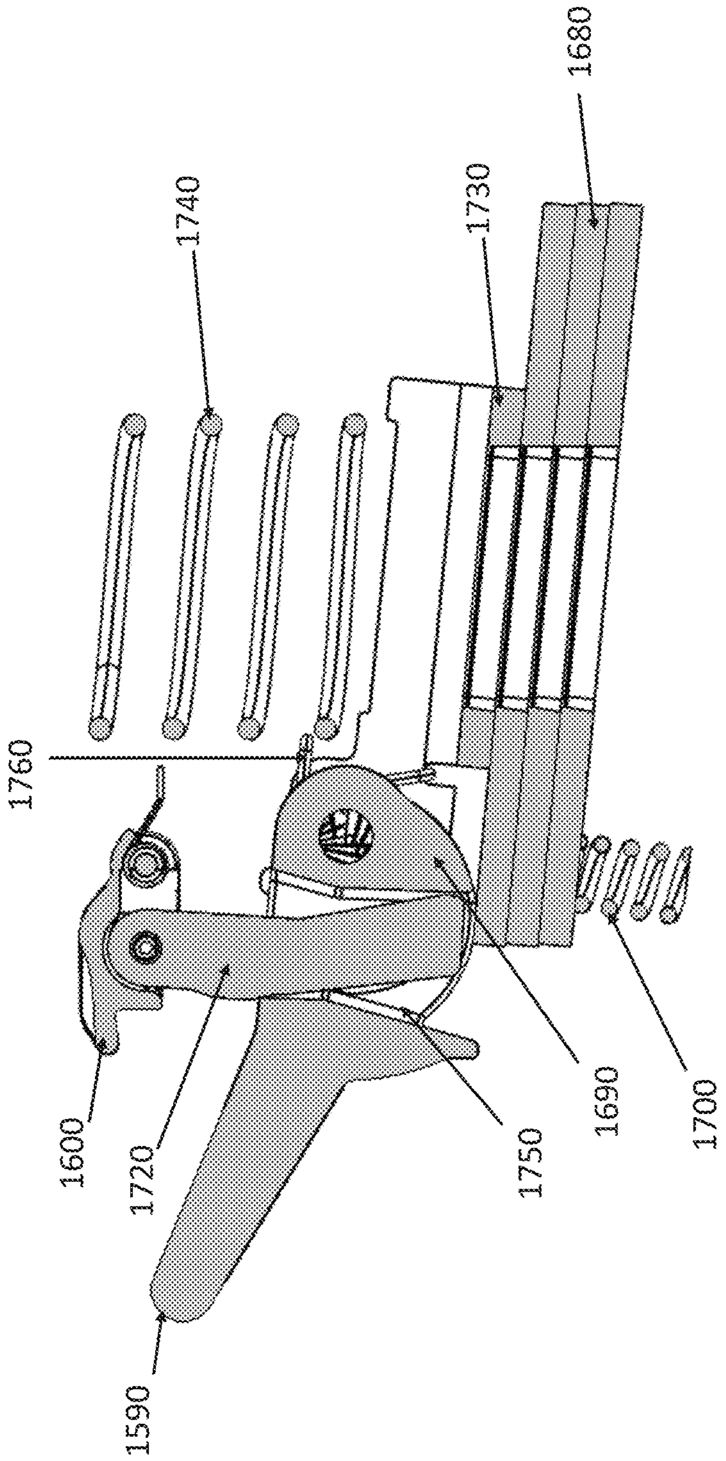
FIG. 17A-FIG. 17C illustrate a side cross sectional view of a subassembly of the lifting and lowering tool of FIG. 14, showing the incremental lowering and release actuators in neutral, incremental lowering, and released positions respectively.
Figure 17B:
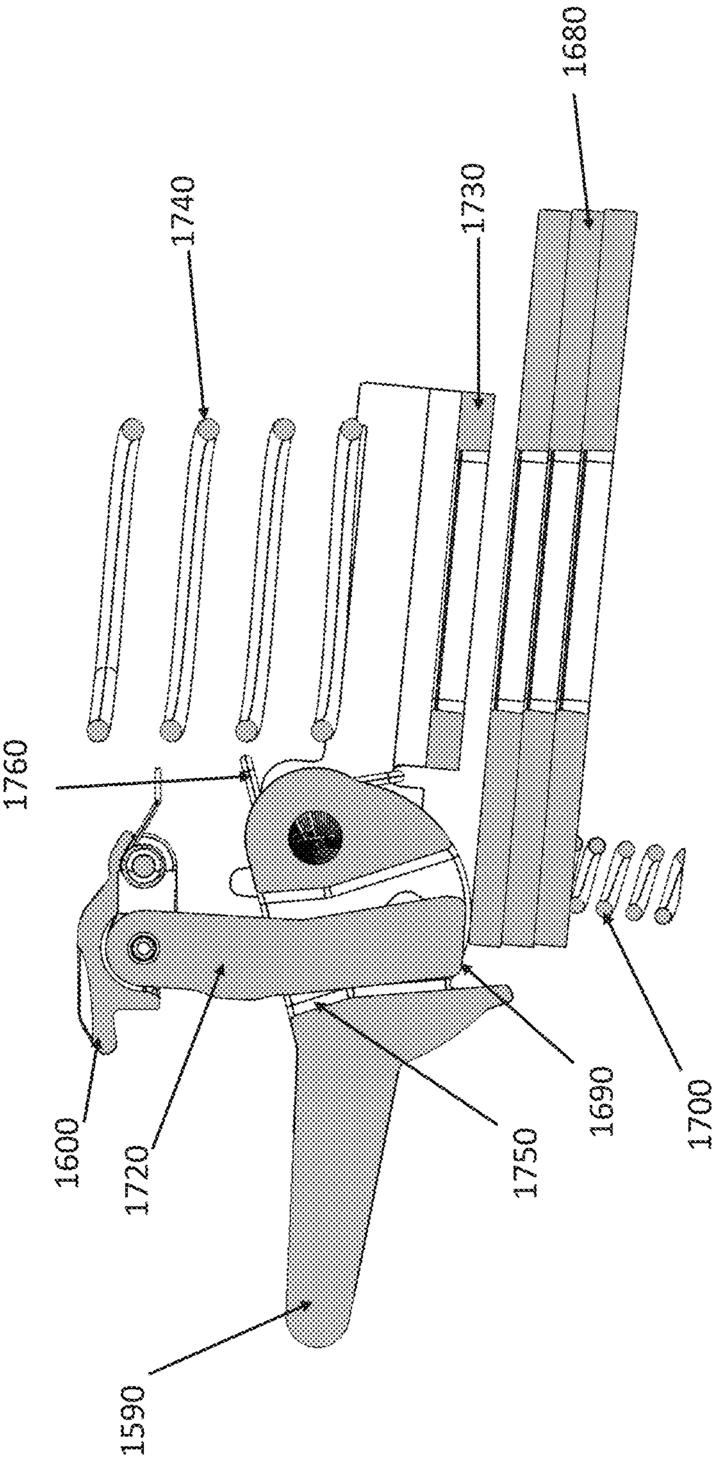
Figure 17C:
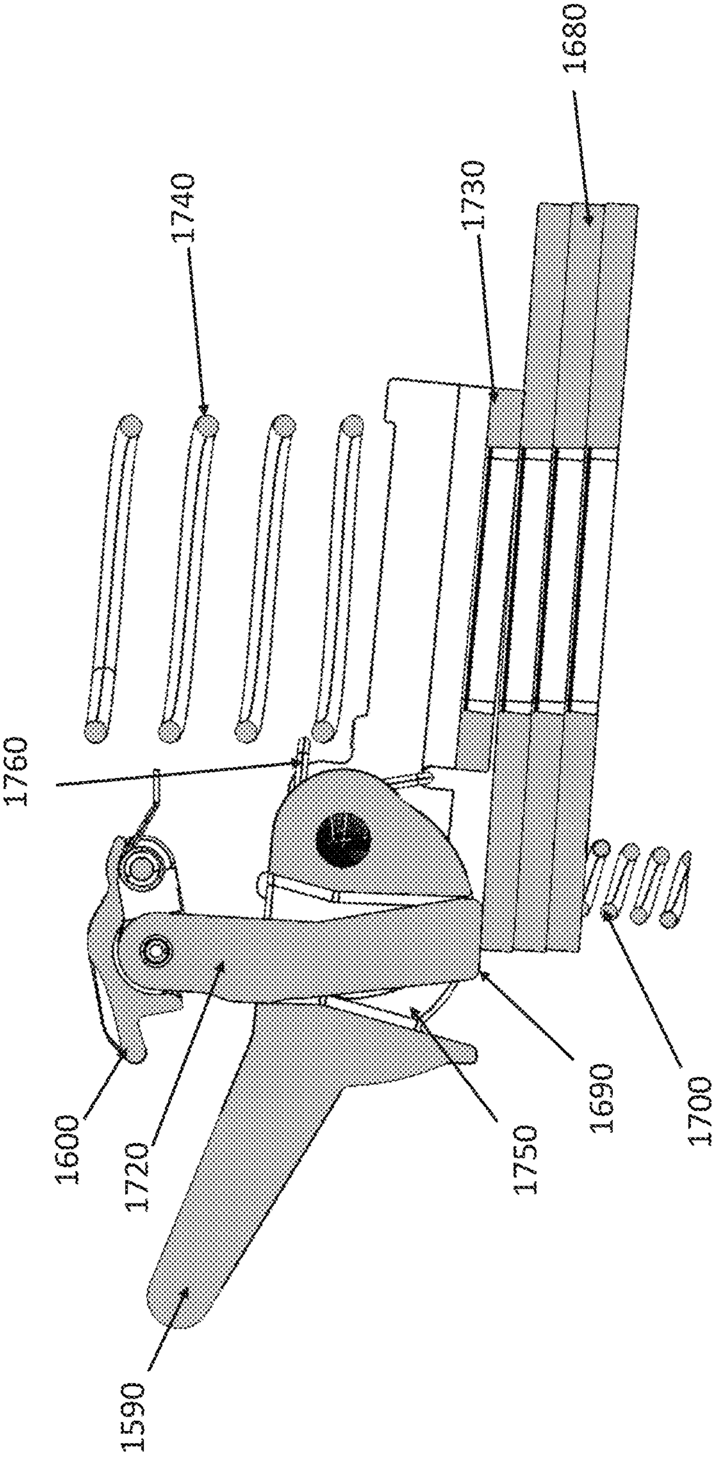

The engagement of the lowering actuator 1590, the release actuator 1600, the locking plates 1680 and the holding plate 1730 may be easier understood with reference to FIGS. 17A-17C, depicting cross sectional views bisecting a subassembly of those components. FIG. 17A illustrates the subassembly at rest, as it would be holding onto the bar 1520 to prevent movement of the movable assembly 1530 relative to the bar 1520. As shown, the release actuator cam 1720 may pass through an aperture 1750 in the lowering actuator 1590, so that the lowering actuator 1590 may be actuated without engaging the release actuator cam 1720.

As shown in FIG. 17B, pulling on or otherwise rotating the lowering actuator 1590 causes the lowering actuator cam 1690 to press on the locking plates 1680, pulling the bar 1520 upward, moving the movable assembly 1530 down towards the foot 1510. As the holding plate 1730 remains engaged on the bar 1520, movement is limited to the aforementioned increment. It may be appreciated that in an embodiment, a spring 1760 (e.g., a torsion spring in the illustrated embodiment, configured to bear against the housing 1560 and a recess in the lowering actuator 1590) may return the lowering actuator 1590 to its unactuated position.

As shown in FIG. 17C, however, the release actuator cam 1720 may be shaped to engage with both the holding plate 1730, and the lowering plates 1680, such that actuating or in the illustrated embodiment the pressing the release actuator 1700 pushes down on the release actuator cam 1720, which pushes against the holding plates 1680, and by virtue of the engagement between the holding plate 1730, the release lever cam 1720, and the aperture 1750 in the release actuator cam 1590, causes disengagement of both the holding plate 1730 and the lowering plates 1680 from the bar 1520, such that the movable assembly 1530 freely moves along the bar 1520 without being limited to the incremental movement. It may be appreciated that in an embodiment, a spring 1770 (e.g., a torsion spring in the illustrated embodiment, configured to bear against the housing 1560 and a recess in the release actuator 1600) may return the release actuator 1600 and the release actuator cam 1720 their unactuated positions.

Figure 18:
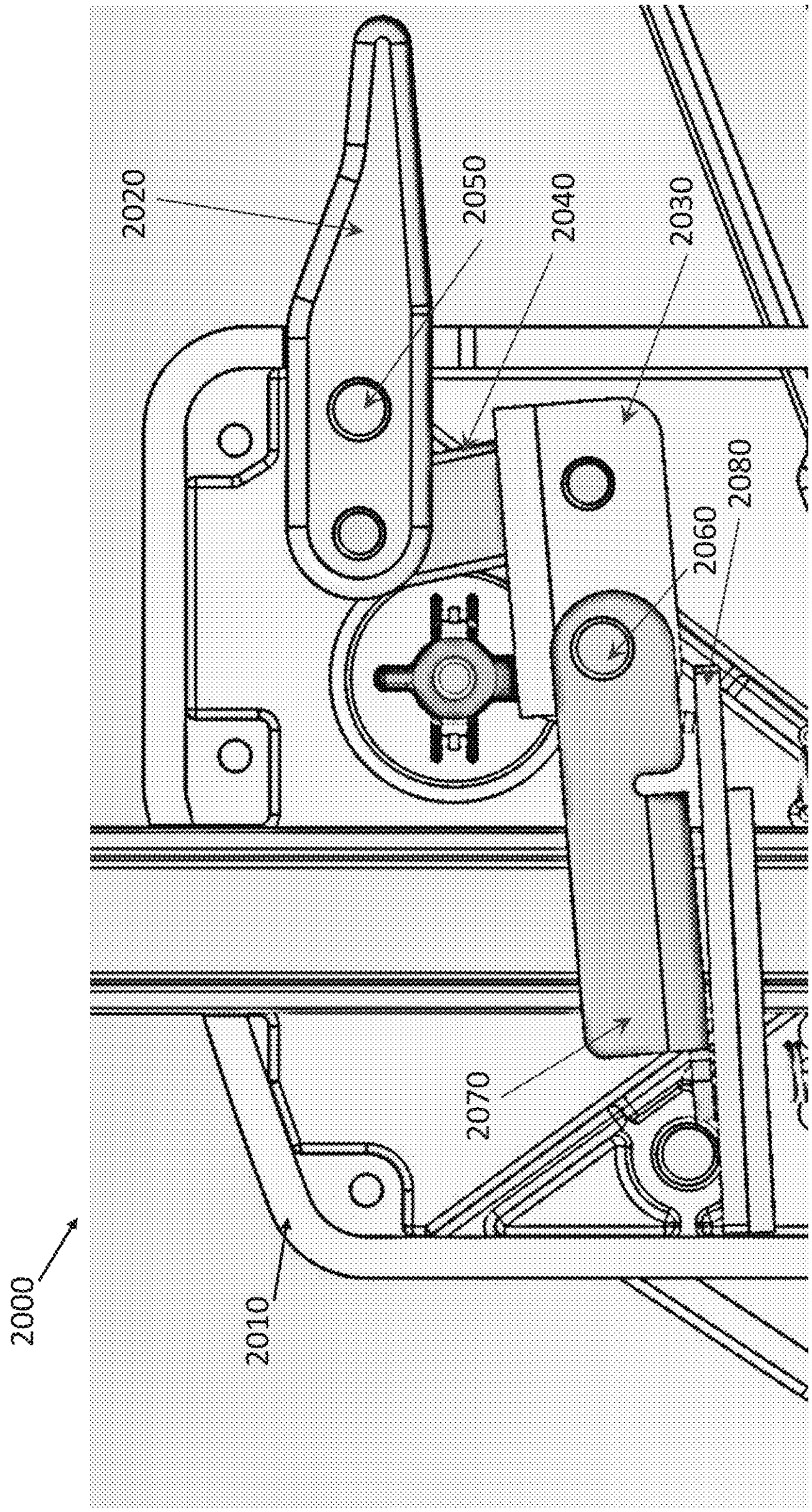
FIG. 18 illustrates an interior side view of a fifth embodiment of the lifting and lowering tool in an unactuated position.
Figure 19:
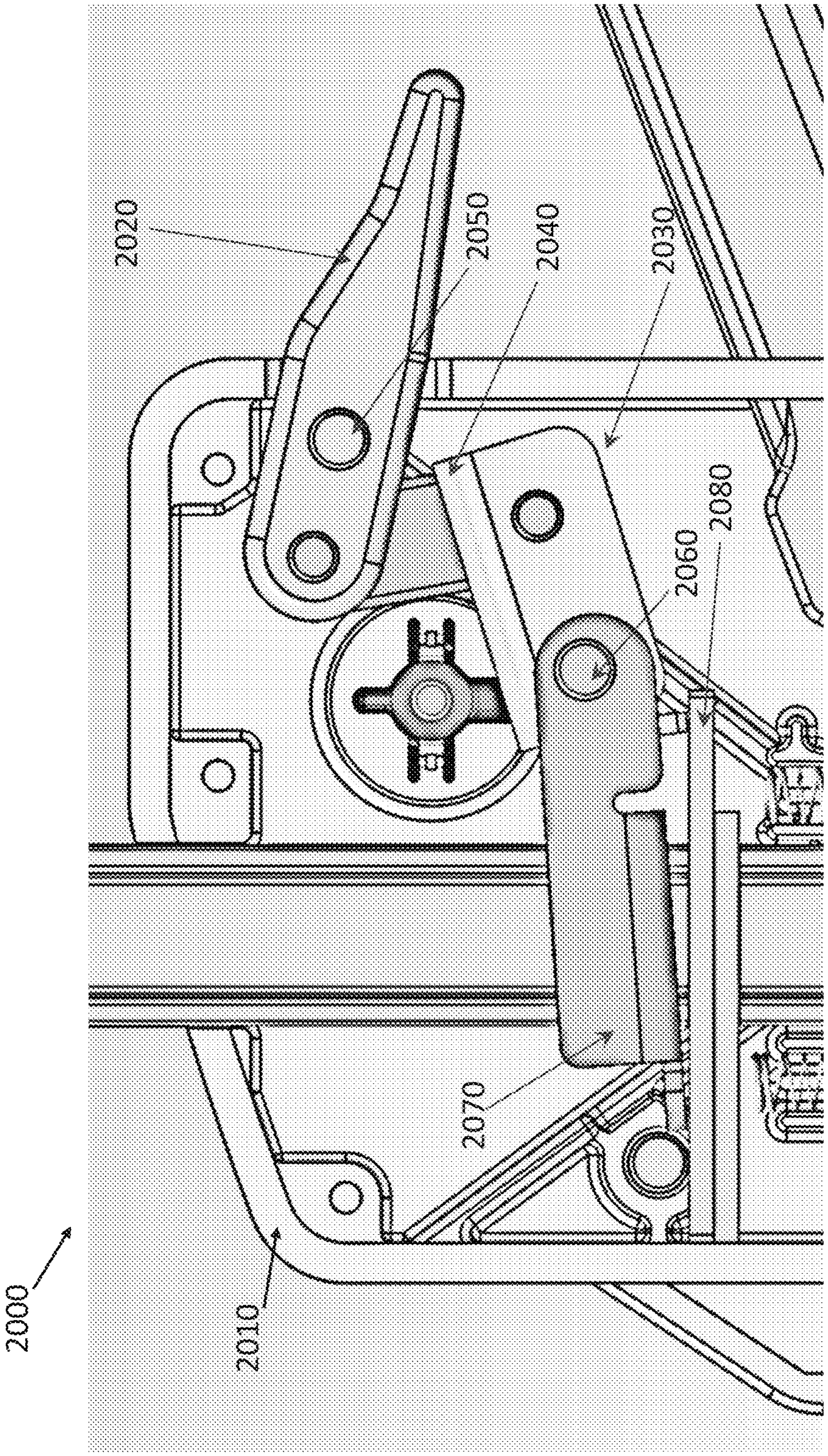
FIG. 19 illustrates the interior side view of the embodiment of the lifting and
lowering tool of FIG. 18 in an actuated position.

FIG. 18 illustrates a side cross sectional view of an embodiment of a lifting and lowering tool 2000, showing the internal mechanism inside the housing 2010, of another embodiment in which a lowering trigger 2020, configured to be actuated by a user's thumb, is connected to the lowering plate 2030 by a connecting link 2040 or other linkage. Pressing down on the lowering trigger 2020 lifts an inboard end of the trigger 2020 by rotating the trigger 2020 about a pivot 2050, causing the lowering plate 2030 to rotate about a pin connection 2060 with the holding plate 2070. As the lowering plate 2030 rotates, the locking plates 2080 are pushed downward. The incremental lowering position is shown in FIG. 19.

Figure 20:
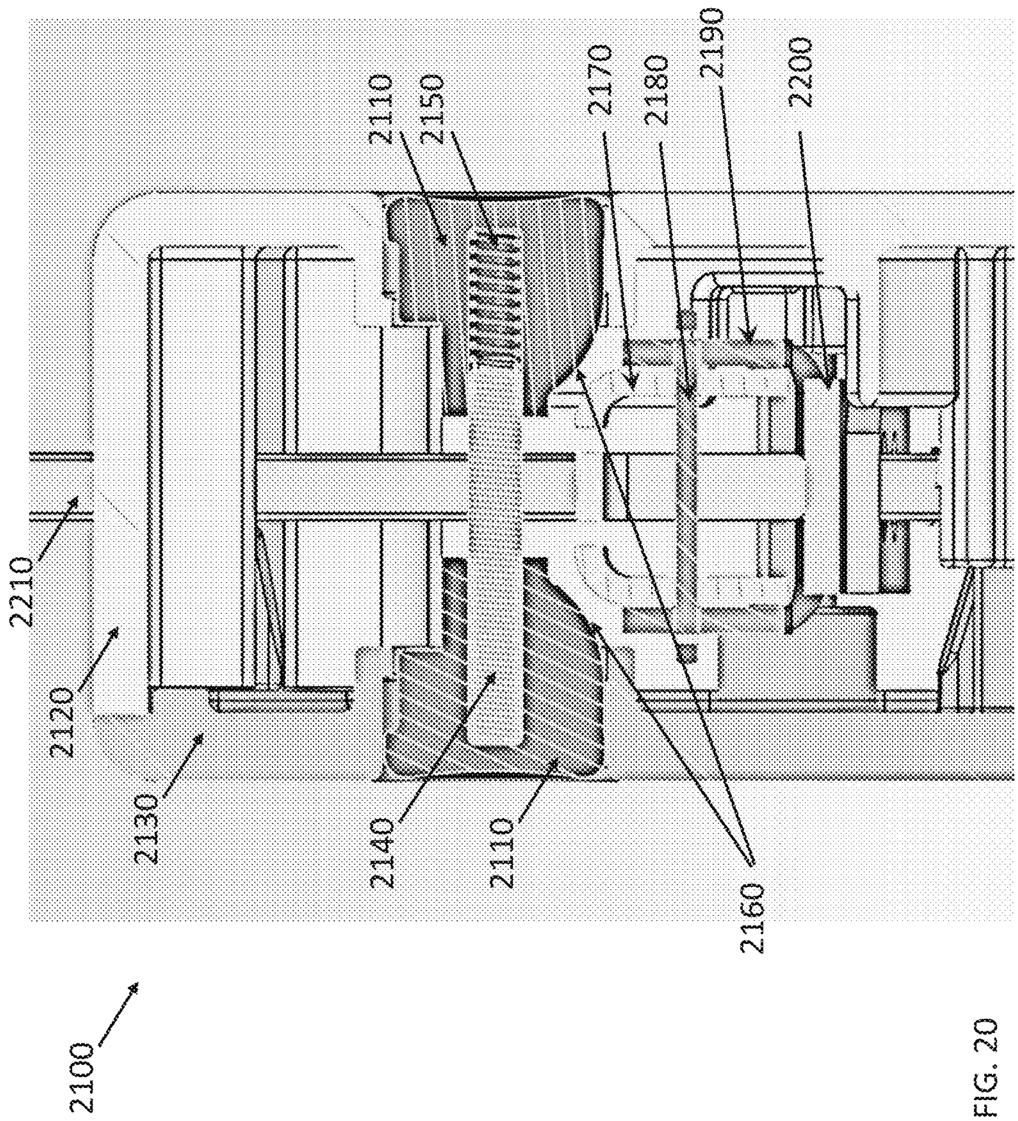
FIG. 20 illustrates a front or rear sectioned view of a sixth embodiment of the lifting and lowering tool in an unactuated position.
Figure 21:
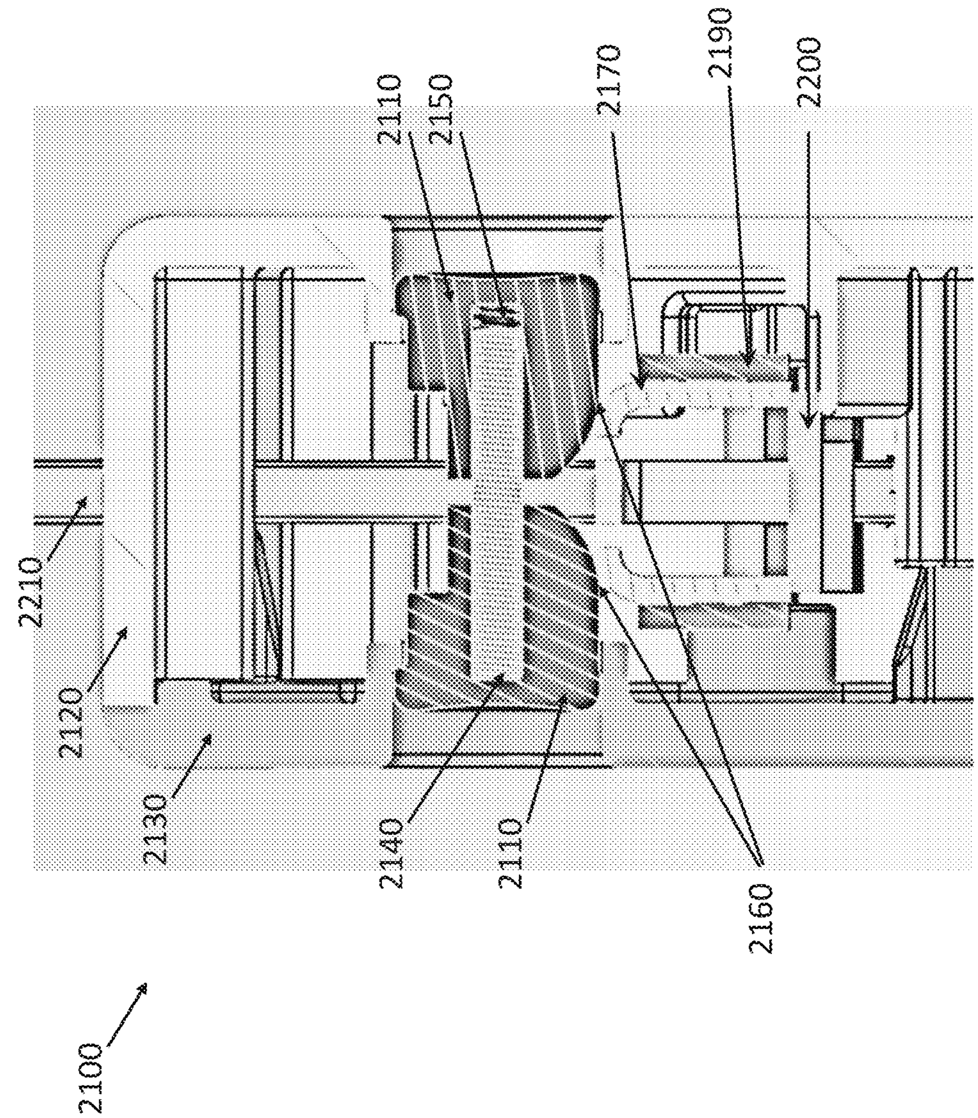
FIG. 21 illustrates the front or rear sectioned view of the embodiment of the lifting and lowering tool of FIG. 20 in an actuated position.

As shown in a front or rear cross-sectional view of an embodiment of a lifting and lowering tool 2100 in FIG. 20, in some embodiments a pushbutton mechanism may be configured to provide full release of the lift. In such an embodiment one or more push buttons 2110 may be held in the housing 2120 and cover 2130. In an embodiment, a pin 2140 is used to maintain alignment of the buttons 2110. A spring 2150, as shown, may return the buttons 2110 to their disengaged position when released. As shown, pressing the one or more buttons 2110 inward may engage the cam surfaces 2160 against a top of the lowering plate 2170, in the area just above a pin 2180 connecting the lowering plate 2170 to the holding plate 2190. As the cam surfaces 2160 advance, the lowering plate 2170, holding plate 2190 and locking tabs 2200 may be pushed down until they disengage with the bar 2210, allowing the movable assembly to be freely moved up and down the bar. The released position for the embodiment in FIG. 20 is shown in FIG. 21.

Figure 22:
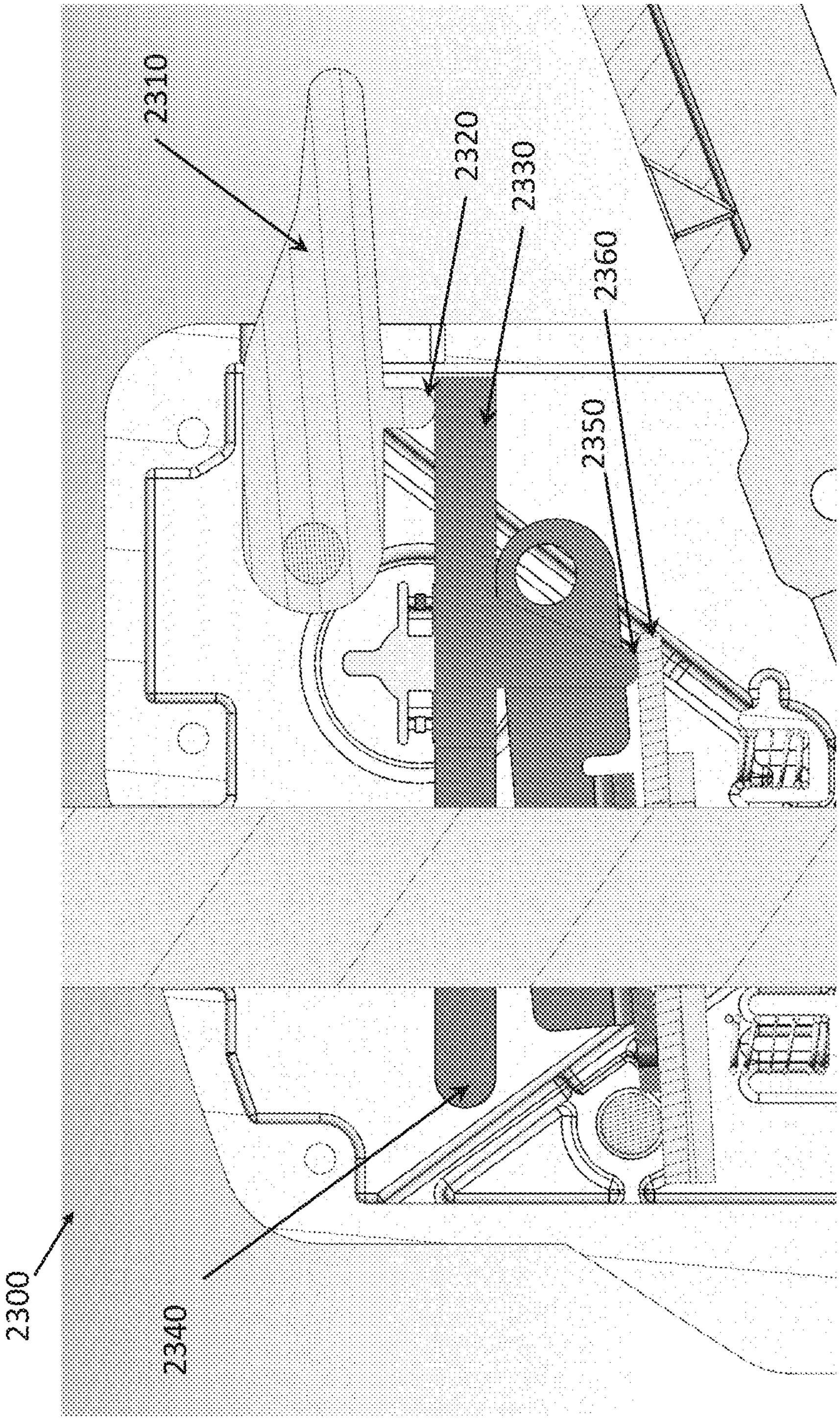
FIG. 22 illustrates a side sectioned view of a seventh embodiment of the lifting and lowering tool in an unactuated position.
Figure 23:
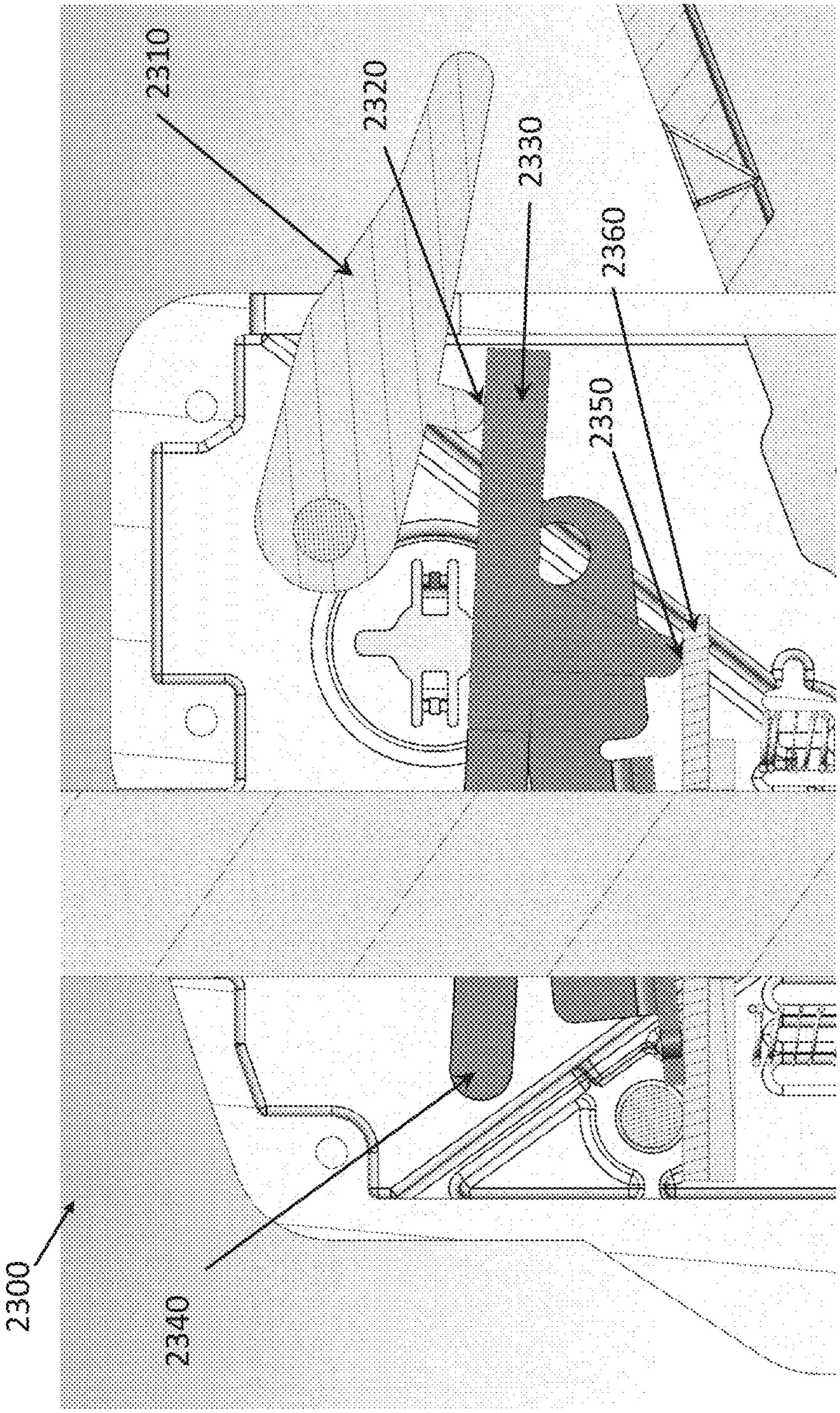
FIG. 23 illustrates the side sectioned view of the embodiment of the lifting and lowering tool of FIG. 22 in an actuated position.

FIG. 22 illustrates an alternative mechanism for providing the incremental lowering function, as implemented in an embodiment of a lifting and lowering tool 2300. The lowering trigger 2310 may be activated by a user pressing down on it. In the illustrated embodiment, a lowering trigger cam surface 2320 contacts the lowering lever 2330, causing it to pivot downward about the lever's pivot point 2340. A cam surface 2350 on the lowering lever pushes down on the locking tabs 2360. The incremental lowering position for the embodiment in FIG. 22 is illustrated in FIG. 23.

Figure 24:
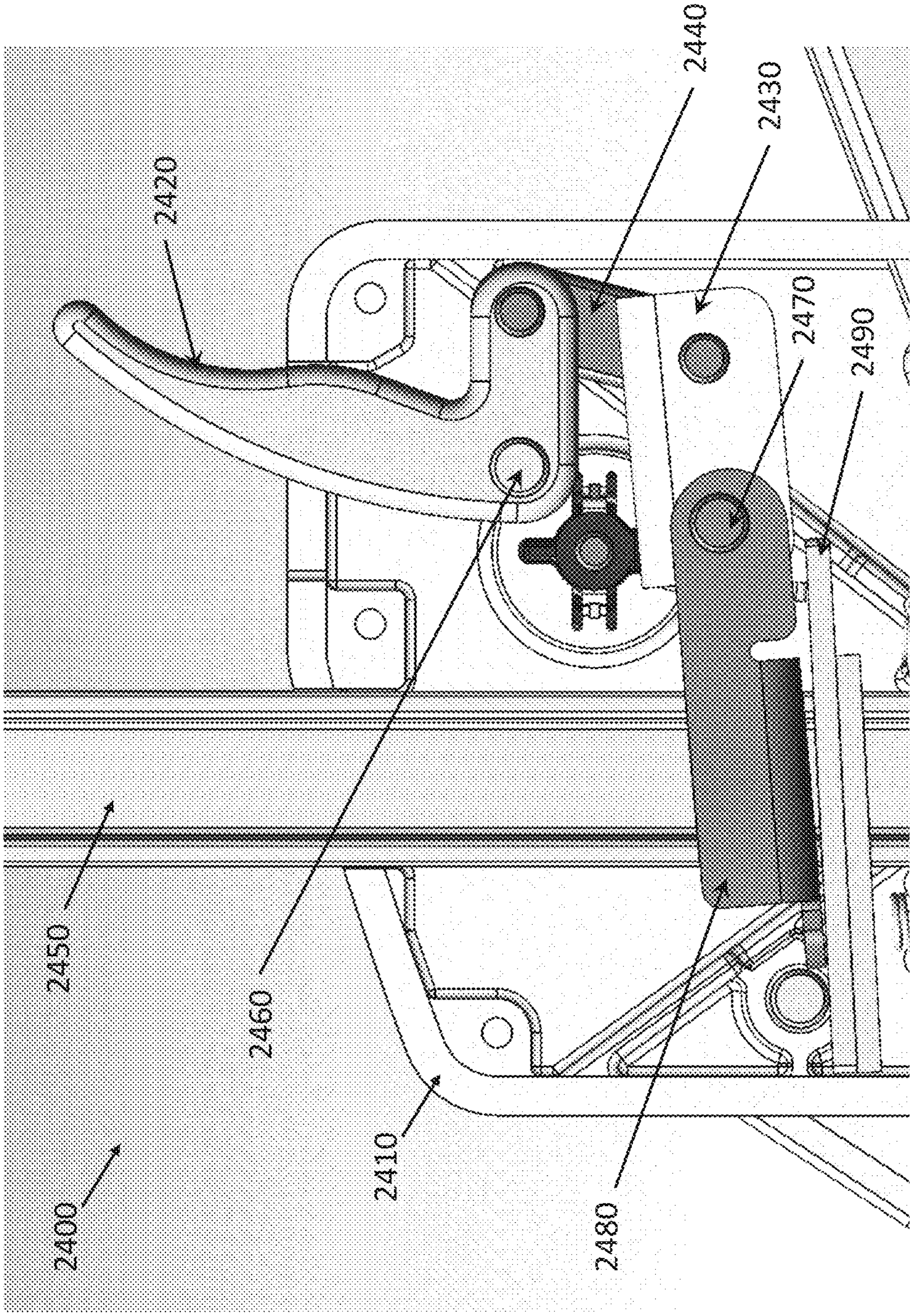
FIG. 24 illustrates an interior side view of an eighth embodiment of the lifting and lowering tool in an unactuated position.
Figure 25:
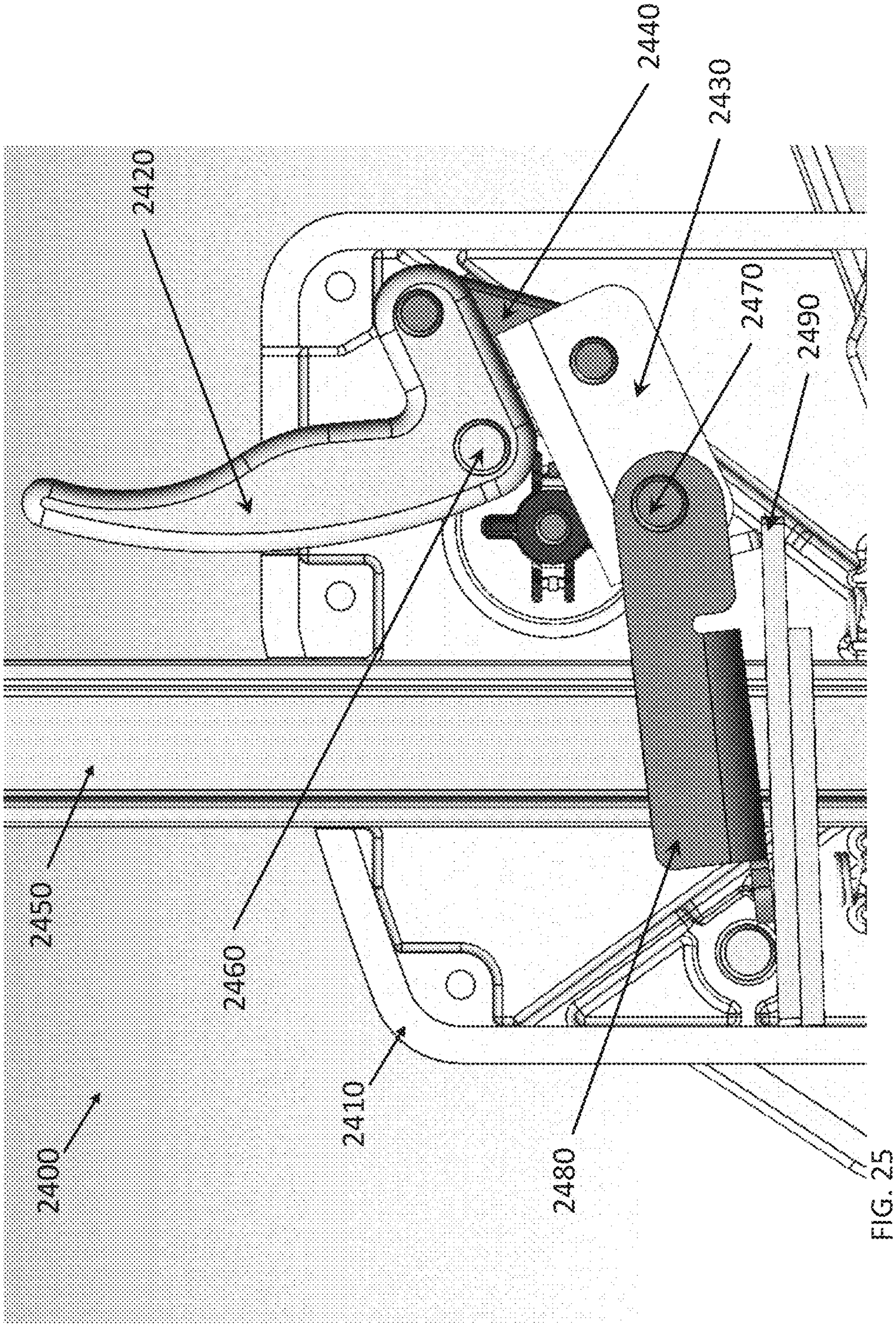
FIG. 25 illustrates the interior side view of the embodiment of the lifting and lowering tool of FIG. 24 in an actuated position.

FIG. 24 shows another side cross sectional view of an internal mechanism of an embodiment of a lifting and lowering tool 2400, inside the housing 2410 thereof, showing an alternative mechanism for providing the incremental lowering function. As illustrated a lowering trigger 2420 is connected to the lowering plate 2430 by a connecting link 2440. When a user pushes the lowering trigger 2420 towards the bar 2450 (e.g., by rotation about a pivot pin 2460), the movement lifts the outboard end of the trigger 2420, and via the connecting link 2440 lifts the outboard end of the lowering plate 2430. This movement causes the lowering plate 2430 to rotate about a pin connection 2470 with a holding plate 2480. As the lowering plate rotates, the locking tabs 2490 are pushed downward. The incremental lowering position for the embodiment of FIG. 24 is shown in FIG. 25.

Figure 26:
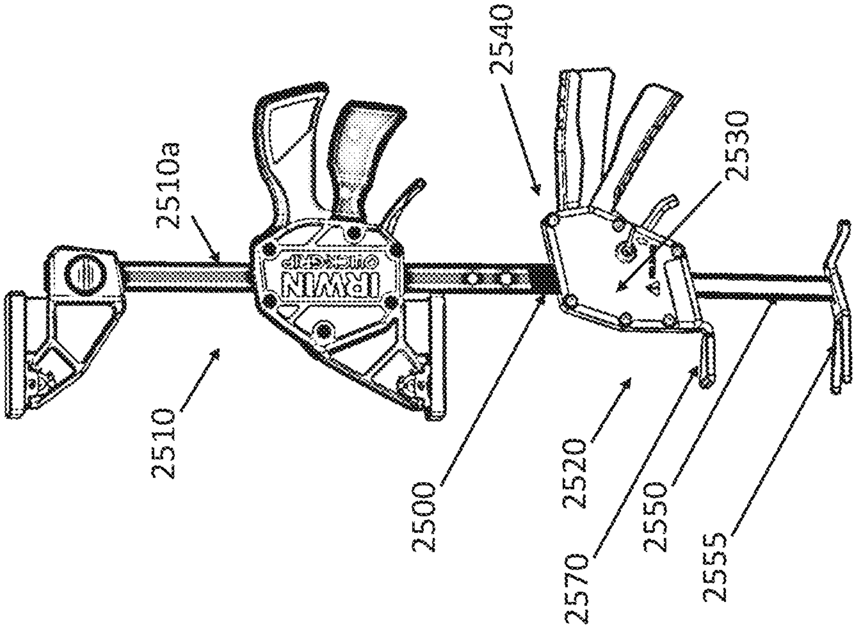
FIG. 26 illustrates a perspective side view of a first embodiment of a coupled assembly of an embodiment of a lifting and lowering tool and a spreader or clamp.

Finally, FIG. 26 illustrates an embodiment of a coupler 2500 between a support extension 2510 (e.g., a spreader or a clamp, including as illustrated a spreader configuration for a bar clamp) and an embodiment of a lifting and lowering tool 2520 similar to or appreciable from any of the embodiments disclosed above. It may be understood that the lifting and lowering tool 2520 may be coupled with the support extension 2510 via the coupler 2500 that interconnects movement of the movable assembly with the support extension 2510. In the embodiment of FIG. 26 the coupler 2500 may be a bar coupler configured as a sleeve that engages with a housing 2530 of the lifting and lowering tool 2520 and as such, movement of the movable assembly 2540 carrying the housing 2530 pushes the bar coupler 2500 (and the support extension 2510 coupled thereto) along the bar 2550 of the lifting and lowering tool 2520. In an embodiment, a bar **2510*a* of the support extension 2510 may be side by side with the bar 2550 of the lifting and lowering tool 2520 when the coupler 2500 is supporting the support extension 2510 on the movable assembly 2530 of the lifting and lowering tool 2520. For example, in the illustrated embodiment, the bar 2550 may be extending behind (and as viewed eclipsed by) the bar 2510*a* of the support extension 2510. It may be appreciated that the support extension 2510 may be considered a part of a movable platform 2570 of the movable assembly 2540, and that in various embodiments it could be construed that the movable platform 2570 or the movable assembly 2540 extends above the bar 2550 away from a foot 2555 of the lifting and lowering tool 2520 when the movable assembly 2540 is positioned adjacent to the foot 2555 (e.g., at a lowest point of lowering of the movable assembly 2540 along the bar 2550**).

Figure 27:
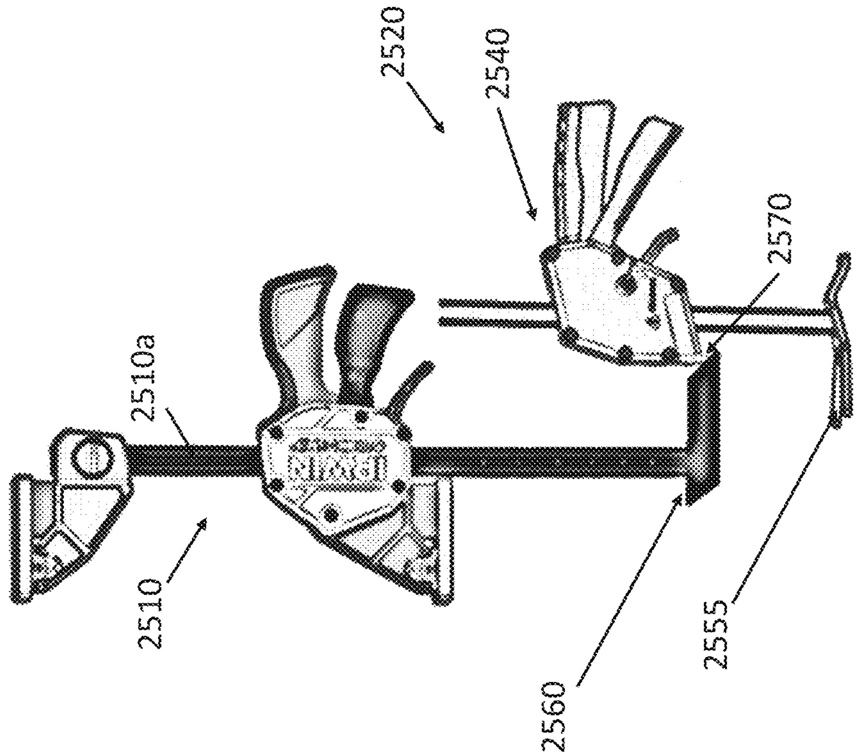
FIG. 27 illustrates a perspective side view of a second embodiment of a coupled assembly of an embodiment of a lifting and lowering tool and a spreader or clamp.

Similarly, as shown in FIG. 27, a movable platform coupler 2560 may slide on or otherwise be fastened to the movable platform 2570 of the lifting and lowering tool 2520, and as such, movement of the movable assembly 2540 may similarly raise or lower the support extension 2510. Such configurations may be useful for lifting and lowering larger objects, such as cabinetry, which may be secured by a spreader or clamp configuration of the support extension 2510 in a manner that balances the cabinetry with respect to the lifting and lowering tool, and may secure the cabinetry via the spreading or clamping configuration of such a support extension 2510 (e.g., spreading within the interior of the cabinetry, or clamping to a surface thereof.

Among the various embodiments disclosed herein, it may be appreciated that a spaced arrangement separating the lowering actuators and the release actuators thereof, and/or the ergonomic engagement of the release actuator being different from the ergonomic engagement of the lowering actuator may prevent an inadvertent use of the release actuator, which could drop a load on a movable platform resulting in damage to the load or injury to a user. For example, where the lowering actuator is a lever, the release actuator could be a pushbutton. Other arrangements may be appreciated facilitating such a configuration. For example, where a lifting actuator and/or the lowering actuator is engaged by a user's palm or index finger, the release actuator may be shaped or positioned to be actuated by the user's thumb. In some such embodiments one or more side buttons may be configured to fully release the load. In some such embodiments, full release may be accomplished by pressing the one or more buttons into the housing, which may disengage both the holding and locking plates allowing the housing assembly to be freely moved up and down the bar. In some embodiments, a pair of buttons may both need to be actuated to release the holding and locking plates, or a pair of buttons may be redundant (e.g., only one button needs to be pressed) but both are provided for either left-handed or right-handed engagement. It may be appreciated that requiring both buttons to be pressed may provide improved safety in preventing accidental full release of the load.

In yet another embodiment, a safety interlock may be built into the lifting arm. When a load is present on the movable platform, the interlock will be pressed down against the movable platform. This will engage a linkage coupled to the lowering actuator which limits how far the lowering actuator can be pressed, so only an incremental lowering can be performed. Once incrementally lowered so the load is removed, the interlock and associated linkage to the lowering actuator disengages, allowing the lowering actuator to be additionally depressed into the full release mode, where the housing assembly can be freely moved up and down the bar.

The objects, features, and characteristics of the present invention, as well as the methods of operation and functions of the related elements of structure and the combination of parts and economies of manufacture, may be apparent upon consideration of the description and drawings herein, all of which form a part of this specification, In one embodiment of the invention, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used herein, the singular form of "a", "an", and "the" include plural referents unless the context clearly dictates otherwise.

In various embodiments, the lifting and lowering tool described herein may be formed from metal, plastic, ceramic, wood, or any other appropriate material, or combinations of such materials. It may be appreciated that the components described herein may be of different constructions or configurations, including but not limited to one or more being comprised of different material choices. For example, various components described herein may each be constructed from a variety of materials, including but not limited to one or more of fabrics, plastics, metals, rubbers, elastomers, or any other appropriate material choice, such as aluminum (e.g., machined aluminum), iron (e.g., steel), ceramic, or any other appropriate material. In addition, portions of tools leveraging the above teachings may be formed from molded plastic, metal, or combinations thereof (e.g., plastic with metal supports or fasteners coupling portions together). In some embodiments, structural and functional components may be formed from metal or hard plastic, while exterior-most gripped components positioned to engage the palm of a gripping hand to provide the palm with a comfortable gripping surface may be made of a suitable molded plastic material or elastomeric material, and may be generally formed as a bi-material suitable molded plastic material coated with a layer of an elastomeric material, such as a rubber-based material. In some embodiments, the material choices may differ from component to component. In various embodiments, some components may be integrally formed together, while other components may be assembled by any appropriate mechanism, including but not limited to fastened, welded, snap-fit, friction fit, adhesive bonding, or other appropriate securements.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope inventions more specifically understood in the context of the above disclosure.

What is claimed is:

1. A lifting and lowering tool comprising:
a foot configured to be supported on a surface;
a bar extending from the foot; and
a movable assembly comprising:
  a housing;
  a movable platform shaped to support a load thereon;
  a lifting actuator configured to incrementally move the movable assembly along the bar away from the foot;
  a lowering actuator configured to incrementally move the movable assembly along the bar towards the foot; and
  a release actuator configured to disengage the movable assembly from the bar to allow free movement of the movable assembly along the bar;
wherein the release actuator is spaced from the lifting actuator and the lowering actuator to prevent inadvertent actuation of the release actuator; and
wherein the release actuator and the lowering actuator extend from a common face of the housing, with the release actuator above the lowering actuator relative to the foot, and the lowering actuator is further extended from the common face than the release actuator.

2. The lifting and lowering tool of claim 1, wherein
the movable platform is coupled to the housing by a flange;
the movable assembly engages the bar through locking plates that are selectively disengaged from the bar through actuation of the lowering actuator; and
the locking plates extend through the flange.

3. The lifting and lowering tool of claim 1, wherein the movable platform extends above the bar away from the foot when the movable assembly is adjacent to the foot.

4. The lifting and lowering tool of claim 3, wherein the movable platform comprises a spreader or a clamp.

5. The lifting and lowering tool of claim 1, wherein the movable platform extends from the housing and includes a flange extending from the movable platform and surrounding the bar.

6. The lifting and lowering tool of claim 1, wherein a portion of the housing is between the release actuator and the lowering actuator.

* * * * *